(12) United States Patent
Alden

(10) Patent No.: US 8,209,992 B2
(45) Date of Patent: Jul. 3, 2012

(54) HIGH EFFICIENCY HEAT PUMP WITH PHASE CHANGED ENERGY STORAGE

(76) Inventor: Ray M. Alden, Raleigh, NC (US)

( * ) Notice: Subject to any disclaimer, the term of this patent is extended or adjusted under 35 U.S.C. 154(b) by 404 days.

(21) Appl. No.: 12/586,784

(22) Filed: Sep. 26, 2009

(65) Prior Publication Data
US 2010/0071394 A1 Mar. 25, 2010

Related U.S. Application Data

(63) Continuation-in-part of application No. 12/217,575, filed on Jul. 7, 2008, now abandoned.

(51) Int. Cl.
*F25B 27/00* (2006.01)
(52) U.S. Cl. .................................................. 62/235.1
(58) Field of Classification Search ............... 62/235.1, 62/509; 700/296
See application file for complete search history.

(56) References Cited

U.S. PATENT DOCUMENTS 4,079,591 A * 3/1978 Derby et al. ................. 60/641.8
4,206,608 A * 6/1980 Bell .............................. 60/698
7,555,897 B2 * 7/2009 Alekseevich et al. ........... 60/398

* cited by examiner

*Primary Examiner* — Melvin Jones

(57) ABSTRACT

The invention described herein represents a significant improvement in the efficiency of heating and cooling processes for applications such as buildings. The working fluid condensation process is time separated from the working fluid vaporization process. Work on the working fluid through a phase transformation is performed at a first time and the heating or cooling of a building through a reverse phase transformation is done at a second time. A storage medium is provided to store the capacity to heat or the capacity to cool in the form of the phase transformed working fluid stored at a positive or a negative pressure. Controlling logic calculates what the heating and cooling load will be in the future and when least expensive and most efficient operating times are forecasted to be. The compression or vacuum energy input phase of operation is be performed during the most optimal window as seldom as once per week while the application heating or cooling process is performed continuously as needed.

20 Claims, 13 Drawing Sheets

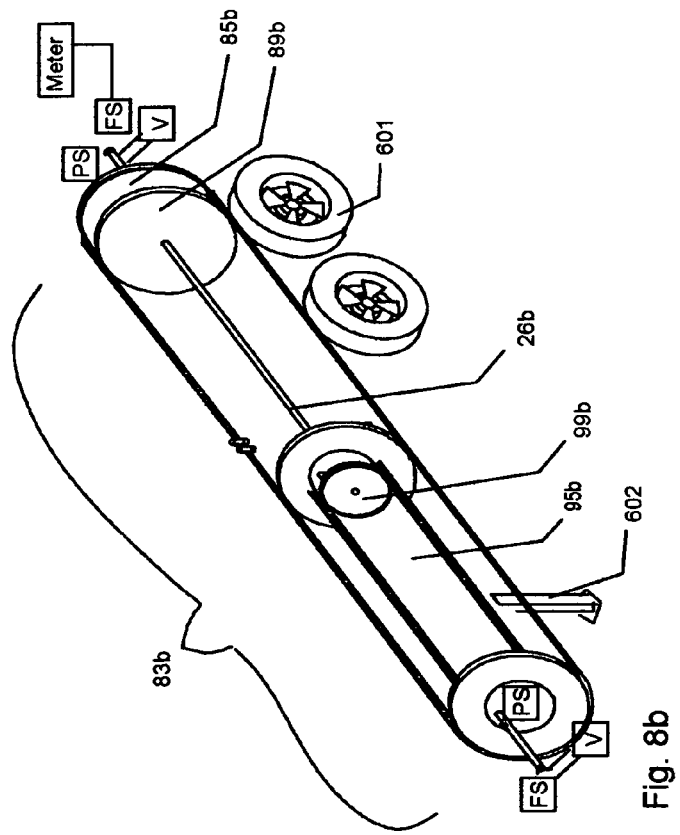
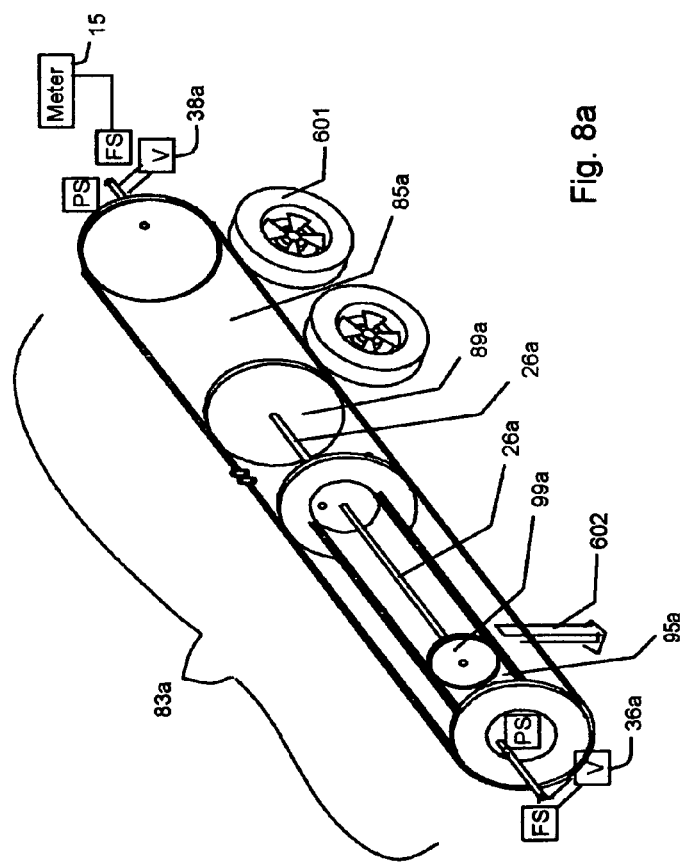

HIGH EFFICIENCY HEAT PUMP WITH PHASE CHANGED ENERGY STORAGE

RELATED APPLICATIONS

This invention is a Continuation In Part of U.S. patent application Ser. No. 12/217,575 filed on Jul. 7, 2008 now abandoned.

BACKGROUND

1. Field of Invention

This invention relates to heat pumps used in heating and cooling a wide range of applications such as in buildings, refrigeration, or industrial processes for example. More specifically, this invention relates to methods to store energy in the form of a phase change in fluid whereby that energy can be passively recovered to perform and heating or cooling function with no energy input.

2. Description of Prior Invention

Heat pumps are well known and have been used for heating and cooling applications for more than 100 years. As practice today, heat pumps use a full refrigeration cycle that comprises both a compression component and an expansion component. When compared to the present system, the prior systems, when used for heating waste a capacity to cool and when used for cooling waste a capacity to heat. By contrast, the present system divides the refrigeration cycle into two separate and distinct operations such that compression only is used for cooling and expansion only is used for heating. Many benefits accrue to such a system. U.S. Pat. No. 6,453,868 Alden, describes a process to divide a heat-pump process into two parts and adds intermediary steps of transporting or storing refrigerant such that energy utilized to compress a refrigerant for a heating function is stored in the form of a compressed fluid to later be expanded for a cooling function.

BRIEF SUMMARY

The present invention integrates an air, ground, or water sourced heat sink together with a pumping system to perform working fluid phase changes for either gas to liquid or liquid to gas. The phase changed working fluid provides a means for energy storage as a capacity to heat or cool that can later be utilized passively with no additional energy input. In some embodiments, desalination is performed with potable water as a cogenerated output.

Objects and Advantages

Accordingly, several objects and advantages of the present invention are apparent. It is an object of the present invention to provide an energy efficient heating processes. It is an object of the present invention to provide an energy efficient cooling process. It is an object of the present invention to store energy in a phase changed state for subsequent use later in passive heating or cooling. It is an advantage of the present invention that highly energy efficient, low cost operation is combined with additional advantages such as potable water, storage of wind energy as a phase changed fluid, storage of solar energy as a phase changed fluid, electricity generation, and back up propane burner.

Further objects and advantages will become apparent from the enclosed figures and specifications.

DRAWING FIGURES

FIG. 8a illustrates a passive pressure regulating gas and liquid working fluid hauling means filled with propane as a gas.

FIG. 8a illustrates the passive pressure regulating gas and liquid working fluid hauling means of FIG. 8a but filled with propane as a liquid.

DETAILED DESCRIPTION OF THE INVENTION

Figure 1A:
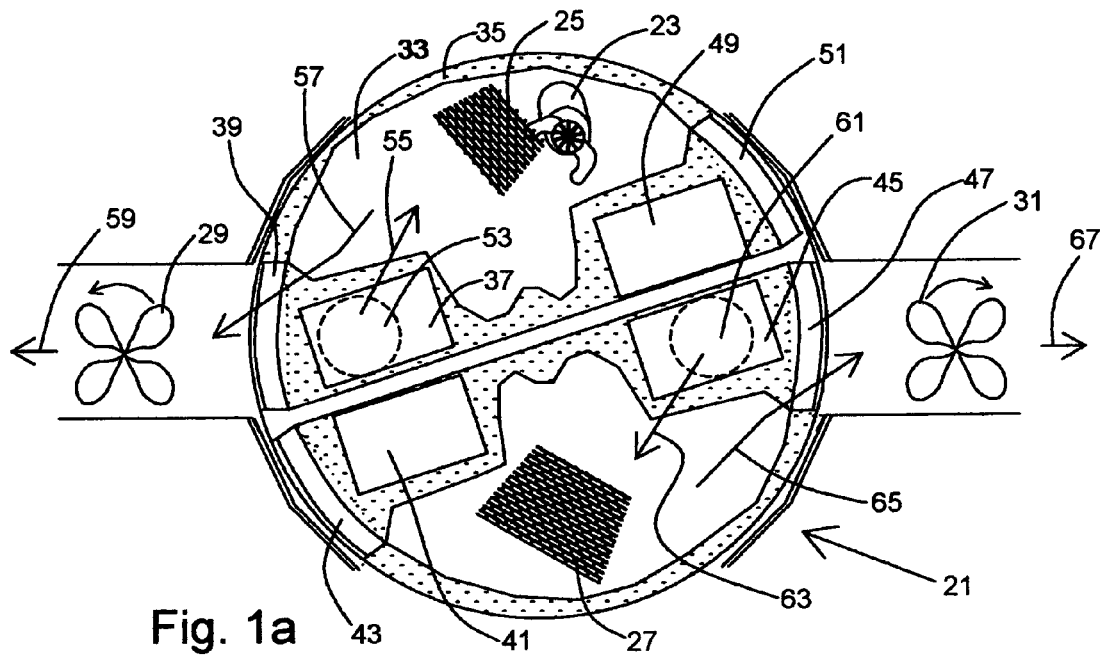
FIG. 1a illustrates a heat pump set to a heating function mode of operation.

FIG. 1a illustrates a heat pump set to a heating function. A heating heat pump 21 to comprises elements and processes that provide a heating function as in FIG. 1a. A pump 23 compresses a working fluid through a phase change from a gas to a liquid while operated in conjunction with a condenser 25 which provides a medium for heat dissipation from the fluid as a heated air 57 which is blown by a circulation fan 29 as a warmed air 59 into a building as later described. A recirculated air 55 via a stationary recirculation port 53 passes back from the building, through the condenser 25 as part of a circulating heating airflow from the building to the heat pump and back to the building. During winter operation, the elements described thus far operate according to a thermostat setting in the building together with logic and processes Described in FIGS. 3a, 3b, 4a, 4b, and 5. During winter operation the vaporizer side of the heat pump 21 operates on a schedule independent of the pump 23 to optimize heat dissipation based upon predicted and real-time heat sink/heat source temperatures and controlling logic as later discussed in FIGS. 4a and 4b.

A vaporizer 27 often operates asynchronously compared to the pump 23 in accordance with logic discussed later. When in operation, heat is absorbed from an exhaust air intake 63 via a stationary intake port 61 which is pulled though the system by an exhaust fan 31 to become a cooled exhaust 65 which is dumped from the heat pump 21 as a cooled exhaust air 67.

Note that, as later discussed and depending upon which is more efficient, the stationary intake port 61 may provide flow from an air source heat sink, a ground source heat sink, or a salt water source heat sink. While the pump 23 and vaporizer 27 are affixed to a stationary platform 33 portion of the heat pump 21 so as to be in fixed connection with working fluid pipes as illustrated and describe in FIG. 2, some other elements of the heat pump 21 are mounted upon a rotatable cylinder 35 which can be rotated to optimize performance in both a building heating mode as in FIG. 1a and a building cooling mode as in FIG. 1b.

As illustrated in FIG. 1a, when rotated for building heating, a first rotatable output port 37 and a heating port 39 align with respective openings to ensure air flow from the building through the condenser and pump and back to the building. Similarly, when rotated for building heating, a first rotatable intake port 45, and a cool exhaust port 47 align with respective openings to ensure heat absorption from the air source, ground source or water source heat sink through the to vaporizer and back to the air. At the same time when rotated for building heating, a second rotatable output port 41, a cooling port 43, a second rotatable intake port 49, and a heat exhaust port 51 are all closed to air flow.

Figure 2:
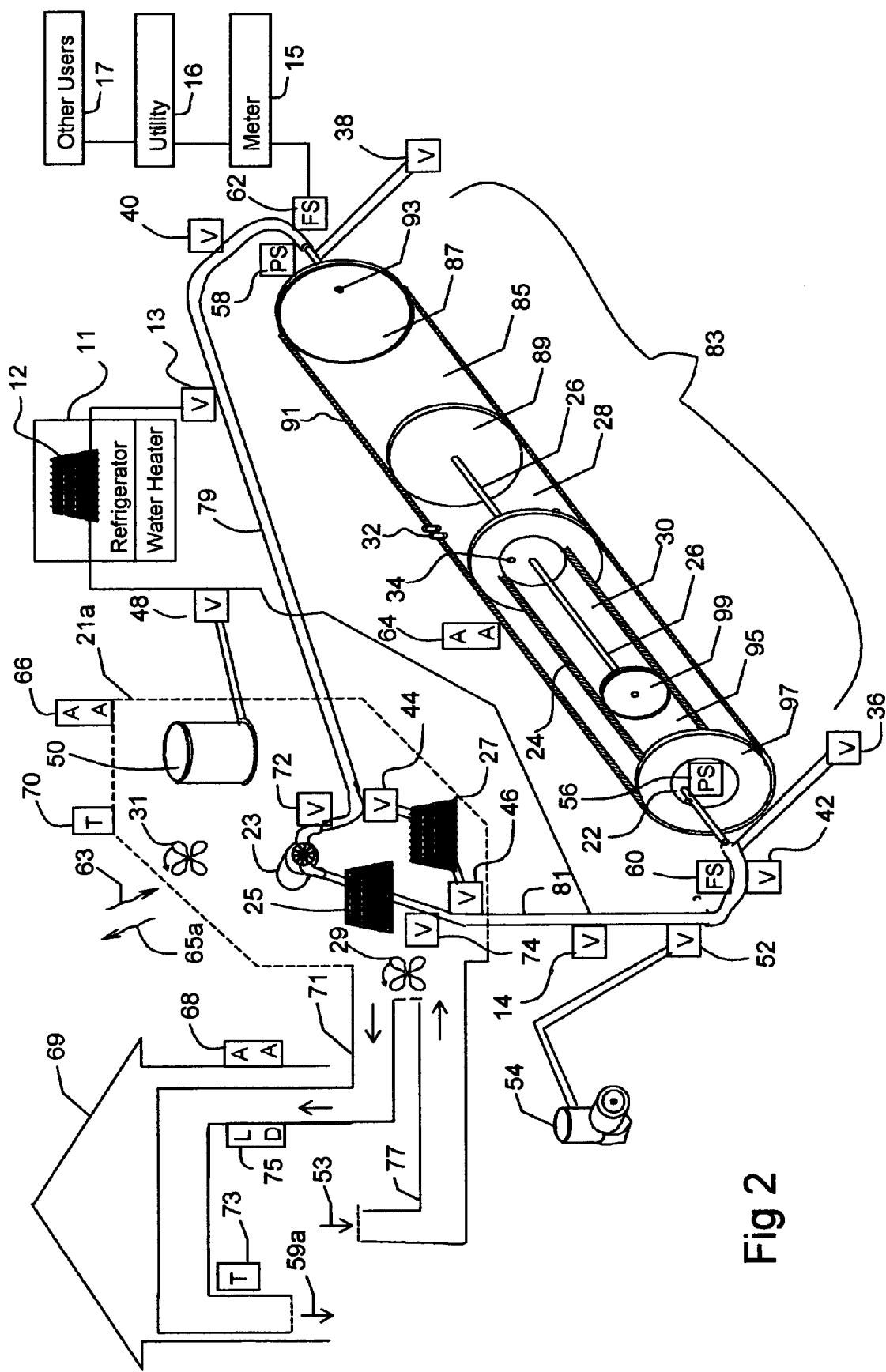
FIG. 2 illustrates elements and processes of a working fluid energy system including fluid storage system.

According to the description of FIGS. 2, 3a, 3b, 4a, 4b, and 5 The operation of the compression side of the heating heat pump is often asynchronous with the operation of the expansion side of the heat pump and as in FIG. 2 the working fluid such as propane provides a means for storing fluid and pressure energy therein for approximately 1 week to minimize operational cost and maximize efficiency.

Figure 1B:
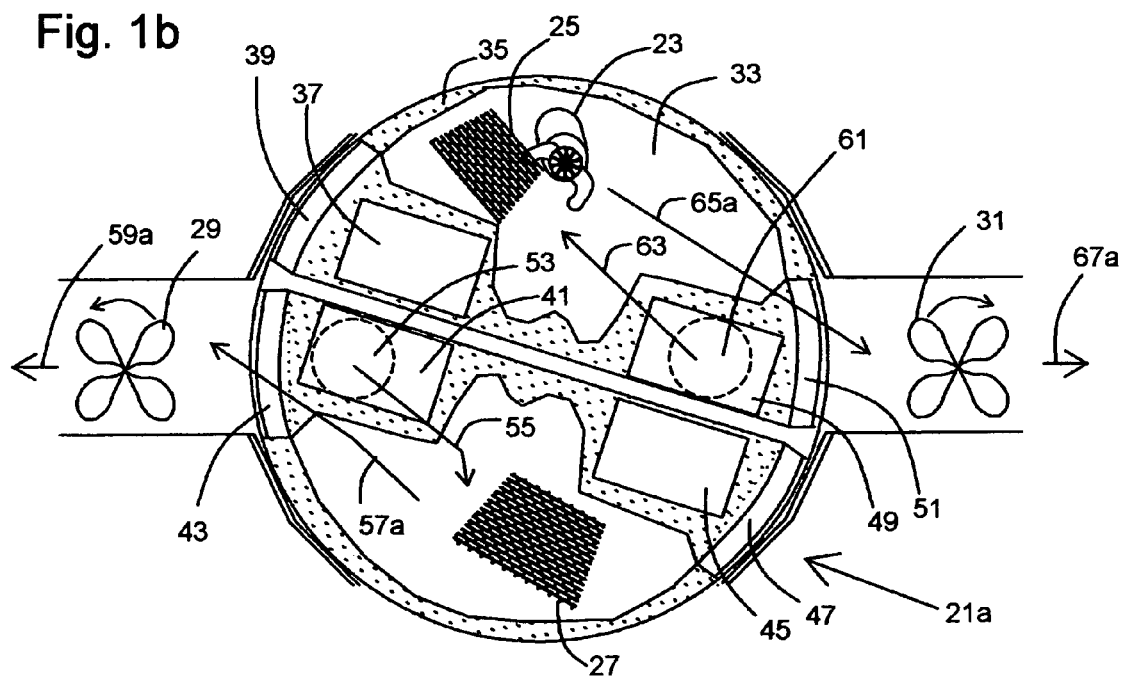
FIG. 1b illustrates the heat pump of FIG. 1a set to a cooling function mode of operation.
Figure 7:
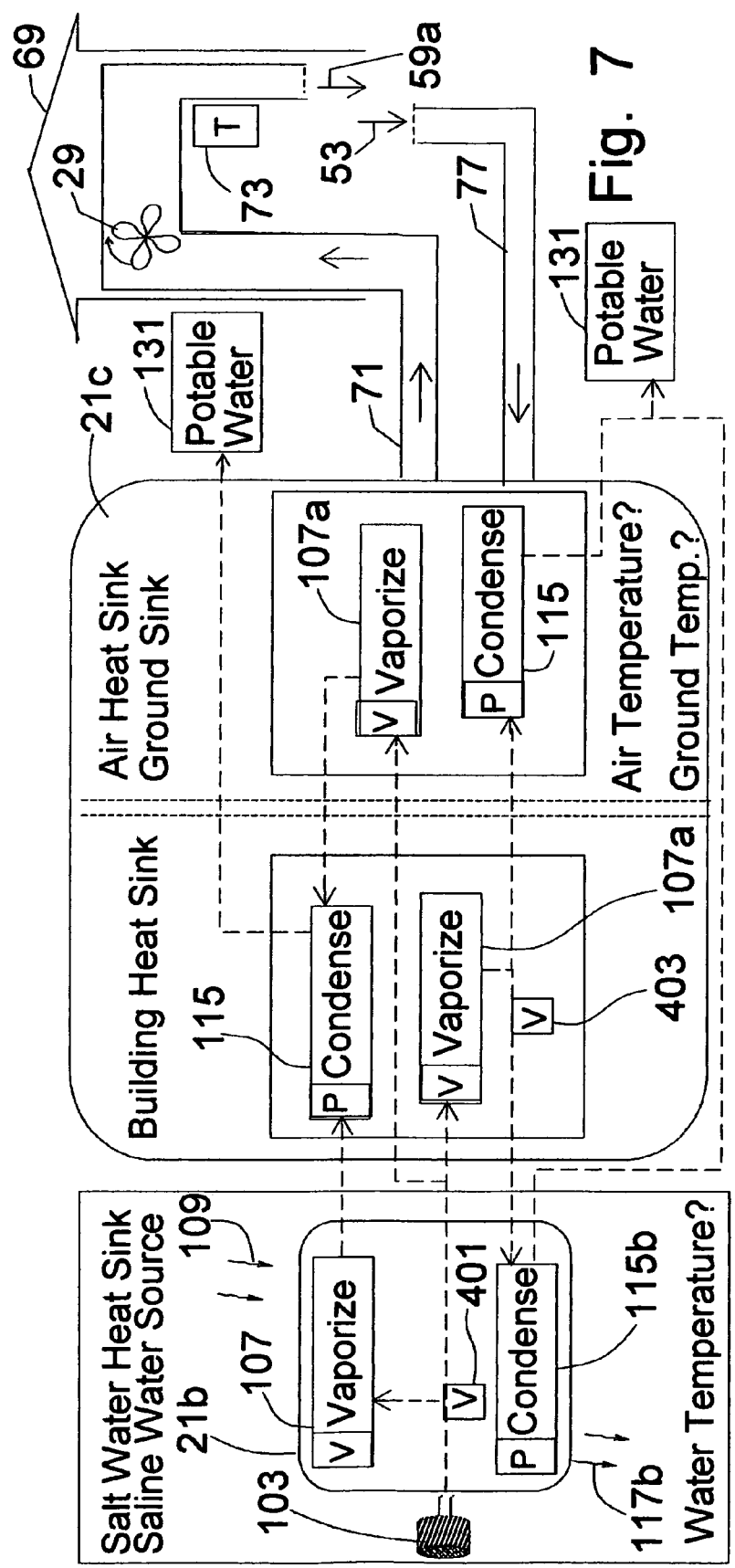
FIG. 7 illustrates a building heating and cooling system having a salt water heat sink source and with a cogeneration desalinated water output.

FIG. 1b illustrates the heat pump of FIG. 1a set to a cooling function. A cooling heat pump 21a is configured for building cooling. While the stationary components of the heat pump of FIGS. 1a and 1b remain in the same positions, the rotatable elements have been physically rotated to be positioned for building cooling. Whereas in FIG. 1a, the heating elements were exposed to the building and the cooling elements were exposed to the heat sink source, in FIG. 1b, the cooling elements are exposed to the building and the heating elements are exposed to the heat sink source. Thus the first rotatable output port 37, the heating port 39, the first rotatable intake port 45, and the cool exhaust port 47 are closed. Meanwhile the second rotatable output port 41, the cooling port 43, the second rotatable intake port 49, and the heat exhaust port 51 are all aligned with respective openings to ensure heat absorption from the building air through the vaporizer and back to the building, and dumping of heat from the pump into the heat sink source. A cold air 57a flows from the vaporizer 27 to return to the building as a cooled air 59a in a circular flow from building through the vaporizer back to building. Often operated asynchronously a heated exhaust 65a is dumped into the source heat sink as a heated exhaust air 67a. As illustrated in FIGS. 2, and 7, the elements of FIGS. 1a and 1b enable a heat efficiently heat and cool a building as controlled by the elements of FIG. 5 and processes of FIGS. 3a, 3b, 4a, and 4b.

In FIG. 1a, the pump 23 and condenser 25 can operate constantly as needed, being turned on and off by the thermostat to ensure the building is properly heated at all times. During this period, the vaporizer 27 in FIG. 1a is operated when the air temperature outside or other heat sink is optimal for contributing heat to be absorbed by the vaporizer 27. In FIG. 1b, the vaporizer 27 operates constantly as needed, being turned on and off by the thermostat to ensure the building is properly cooled at all times. During this period, the pump 23 and condenser 25 in FIG. 1b are operated when the energy costs are lowest and the temperature outside or other heat sink is optimal for absorbing heat from the pump 23/condenser 25) The energy storage of FIG. 2 providing a means to store the capacity to cool as propane in a liquid state.

Condensers discussed in all Figures herein provide a means for heat dissipation while working fluid transitions through a phase change from gas to liquid. Vaporizers discussed in all Figures herein provide a means for heat absorption while working fluid transitions through a phase change from liquid to gas.

FIG. 2 illustrates elements and processes of a working fluid energy system. A variable volume dual pressure storage cylinder 83 provides storage for a working fluid including passive pressure regulation for the fluid as a gas on the right end and passive pressure regulation for the fluid as a liquid on the left end as described below. A low pressure cavity 85 is a cylindrical space for containing a gas propane working fluid rated at 250 psi capacity such as propane tanks commercially available including a low pressure head 87 and a low pressure cylinder 91 made of steel. One end of the low pressure cavity is sealed by a low pressure piston 89 which is able to move within the cylinder in accordance with the pressure therein to regulate the size of the low pressure cavity while maintaining a constant pressure therein. The only means to communicate fluid to or from the low pressure cavity 85 is a low pressure pipe port 93 which communicates fluid as a gas to or from the low pressure cavity 85 as later described via a low pressure pipe 79.

A high pressure cavity 95 is a cylindrical space for containing a propane liquid working fluid rated at 250 psi capacity such as propane tanks commercially available including a high pressure head 97 and a high pressure wall 24 made of steel. One end of the high pressure cavity is formed by a high pressure piston 99 which is able to move within the cylinder in accordance with the pressure therein to regulate the volume of the high pressure cavity while maintaining a constant pressure therein. The high pressure piston 99 and the low pressure piston 89 are physically connected together by a push rod 26, this assembly being fabricated from steel to withstand up to 250 psi, each of the high pressure piston 99 and the low pressure piston 89 comprising an O-ring gasket so as to form a sealed contact with the high pressure wall 24 and the low pressure cylinder 91 respectively. Thus a variable sized low pressure working fluid gas containment cylinder and a variable sized high pressure working fluid liquid containment cylinder are connected with a push rod such that at equilibrium, the lower pressure in the low pressure cavity multiplied by the larger area of the low pressure piston 89 exerts a force equal and opposite to a force exerted by the higher pressure within the high pressure cavity multiplied by the smaller surface area of the high pressure piston 99. Moreover in operation, when the pump moves fluid from the lower pressure gas side of the variable volume dual pressure storage cylinder 83 to the higher pressure liquid side of the variable volume dual pressure storage cylinder 83, the high pressure piston 99, the low pressure piston 89, and push rod 26 assembly slides to the right in the two respective cylinders to passively maintain constant pressure in each of the low pressure cylinder and the high pressure cylinder such is illustrated in FIG. 8b. Identically, when pressure forces fluid through the vaporizer from the higher pressure liquid side of the variable volume dual pressure storage cylinder 83 to the lower pressure gas side of the variable volume dual pressure storage cylinder 83, the high pressure piston 99, the low pressure piston 89, and push rod 26 assembly slides to the left in the two respective cylinders to passively maintain constant pressure in each of the low pressure cylinder and the high pressure cylinder such as is illustrated in FIG. 8a.

On their back sides, the high pressure piston 99 and the low pressure piston 89 respectively define a small back cavity 30 and a large back cavity 28 where an atmospheric pressure is passively maintained. Air entering and leaving the back cavities through respective air exchange ports 32 and secondary air port 34. This enables the cylinders to slide in response to volume changes within their respective cylinders without being effected by back pressure. A high pressure pipe port 22 in communication with a high pressure pipe 81 is the only means by which liquid working fluid can enter or exit the high pressure cavity 95.

While the art described throughout this specification can be utilized with any working fluid, propane, butane or iso-butane are presently thought to be optimal fluids for use in the art of FIG. 2 due to their thermodynamic, low global warming potential, low ozone depletion factor, environmental properties, current and projected availability, and commodity prices. Periodically, it may be necessary to replenish working fluid through a high pressure fill port valve 36 and a low pressure fill port valve 38 also these ports are use to interface with trucks according to FIGS. 8a and 8b. The high pressure fill port valve 36 and a low pressure fill port valve 38 are common to the propane industry and manually operable to be opened when filling and closed when not filling.

In operation, the elements and processes of FIGS. 1a, and 1b are interfaced with the elements and processes described thus far under FIG. 2. The high pressure pipe 81 having connectivity with both the pump 23/condenser 25 and the vaporizer 27. The low pressure pipe 79 having connectivity with both the pump 23/condenser 25 and the vaporizer 27. Intervening valves regulate fluid flows according to the logic of FIG. 5 to optimize performance and minimize cost though a yearly operating cycle and under a wide range of conditions. At any time, for example during system failure or leak detection as later described, a high pressure line valve 42 and a low pressure line valve 40 can be automatically closed to prevent working fluid flow from the variable volume dual pressure storage cylinder 83. These two valves and ensuing valves described herein are electronically controlled solenoid valves common to the petrochemical industry and appropriate pressure/chemically rated for use according to the working fluid selected. Additional valves include a vaporizer output valve 44 which together with a vaporizer input valve 46 selectively opens up fluid flow through the vaporizer 27 or closes off flow through the vaporizer 27. Similarly, the pump input valve 72 together with the pump output valve 74 selectively opens up fluid flow through the pump 23 and condenser 25 or closes off flow through the pump 23 and condenser 25. Thus through the control of valves, fluid can be moved from the low pressure side of storage through the pump 23 and condenser 25 to the high pressure side of storage for a period of time while not at all involving the vaporizer 27. Alternately, through the control of valves, fluid can be moved from the high pressure side of storage through the vaporizer 27 to the low pressure side of storage for a period of time while not at all involving the pump 23 and condenser 25. As described in FIGS. 3a, 3b, 4a, and 4b, the period of time may be predefined to be a week as in FIGS. 3a, 3b, 4a, and 4b or another duration depending upon the application. As is later described running the compression and vaporization sides of the refrigeration cycle at asynchronous times has economic and efficiency advantages. However it may be desirable under certain conditions to run the pump 23 and condenser 25 concurrently with the vaporizer 27 which can be done. By closing the high pressure line valve 42 and the low pressure line valve 40 while simultaneously opening the vaporizer output valve 44, the vaporizer input valve 46, the pump input valve 72, and the pump output valve 74, it is possible to run the pump 23 and condenser 25 concurrently with the vaporizer 27. In any case, a thermostat 73 controls aspects of run functionality as described in FIGS. 1a, 1b, 3a, 3b4a,4b, and 5. Each of these scenarios include air flow interchanges with a climate controlled structure 69 as described in FIGS. 1a and 1b via a duct 77 and return duct 71 which circulate air between the cooling heat pump 21a of FIG. 1b or the heating heat pump 21 of FIG. 1a. Additional sensors are provided to optimize performance and minimize leakage of potentially flammable working fluids such as propane. A first pressure sensor 56 senses the working fluid pressure in the high pressure side of the system. A second pressure sensor 58 senses the working fluid pressure in the low pressure side of the system. An unexpected sensed pressure drop or increase on either the high side or the low side is a system test failure according to FIGS. 3a, 3b, 4a, 4b, and 5 and will cause the system to shut down, closing all valves, and sounding alarms as later described. Similarly, a first flow sensor 60 and a second flow sensor 62 are provided for safety and efficiency. A first audible alarm 64 is provided in close proximity to working fluid storage, a second audible alarm 66 is provided in close proximity to the heat pump unit, and a third audible alarm 68 is provided within the climate controlled building. A leak detector 75 is provided within the climate controlled building to sense whether working fluid is leaking. Carbon dioxide and carbon monoxide sensors (not shown) may also be provide. As described herein, the heat sink may comprise a real-time system choice of air, water, and/or ground, real-time monitoring of the temperatures of each enables the systems logic as in FIGS. 5 and 7 to determine which heat sink to use. An outside thermostat 70 provides real-time information and is used to determine when to run certain aspects of the system for optimal efficiency in accordance with FIGS. 3a, 3b, 4a, 4b, and 5.

A meter 15 may also be provided to sense and record the amount of working fluid that has been burned, as below, or has been moved from the high pressure side to the low pressure side or from the low pressure side to the high pressure side. The meter enables a utility 16 to invoice those customers that are consuming energy in the form of pressure and to pay those customers that are storing energy in the form of pressure. In this scenario, the variable volume dual pressure storage cylinder 83 is maintained by the utility 16 and other users 17 are concurrently piped into the variable volume dual pressure storage cylinder 83 and using it with a heat pump application such as that previously described or with another application.

Other applications or uses of the working fluid stored within the variable volume dual pressure storage cylinder 83 are also available. The system described in FIGS. 4a, 4b, and 5 performs a calculation as to when it is cheaper to operate a gas burner 50 as compared to the heat pump. This can occur if the price of propane falls dramatically in a region compared to the price of electricity. Burning propane for heat may also be a necessity during a winter power outage for example. In either case, if the system determines that burning propane is the prudent course, a burner valve 48 is opened to provide propane flow to the gas burner 50 which then provides the heat for the climate controlled building. The gas burner 50 is positioned within the heat pump of FIG. 1a so as to utilize the heat pump's air flow integration with the building. Hospitals are a good example of facilities that need redundant heating and power systems as provided herein such that temperature is maintained for patient health in the face of various scenarios. Similarly, when propane, or butane or iso-butane are used as the working fluid a backup generator 54 can be used to provide electricity during a power outage or if the system ever determines that the commodity price of electricity multiplied times efficiency exceeds the commodity price of propane multiplied by efficiency, such scenarios and logic are described in FIGS. 3a, 3b, 4a, 4b, and 5. If the generator is to be utilized, a generator valve 52 opens to allow propane to flow to the backup generator 54 where it is burned to produce electricity. Similarly, a refrigerator 11 can be connected to the variable volume dual pressure storage cylinder 83. The refrigerator 11 need not have a compressor but need only have a refrigerator vaporizer 12 which when in use allows fluid to pass there though from high pressure storage through a refrigerator high valve 14 to a refrigerator low valve 13 to the low pressure storage side of the system to under go a liquid to gas phase change. Also a hot water heater can be connected having a pump and no vaporizer where the pump moves fluid from the low pressure side to the high pressure side and in the phase transition from gas to liquid process heats water.

As of 2009, the US EPA (Environmental Protection Agency) has approved the use of iso-butane as a refrigerant working fluid in General Electric's Monogram refrigerators. It is expected that the EPA will also approve the use of iso-butane (R-600a), butane (R-600), and propane (R-290) for the applications discussed herein due to environmental advantages they have over fluorine based working fluid refrigerants. According to ASHRAE Propane's coefficient of performance is 4.57 and utilizing the art herein, a single compression cycle can be utilized to perform first a heating function and then a cooling function, thus the present art can deliver an effective coefficient of performance of 4.57 in heating plus 4.57 in cooling for a 9.14 COP. Propane use here is odorized.

As described in FIG. 2, work is done on a gas to compress it to a liquid which then comprises a stored capacity to cool with no additional work input. The same apparatus can be used to perform work on a liquid to expand it to a gas which then comprises a stored capacity to heat with no additional work input. For example, if as described later, water is the working fluid, a vacuum pump expands the water through a gas phase change, and said gas can be stored in the cylinders of FIG. 2 or the storage tanks of FIG. 11 as a stored capacity to heat.

Figure 3A:
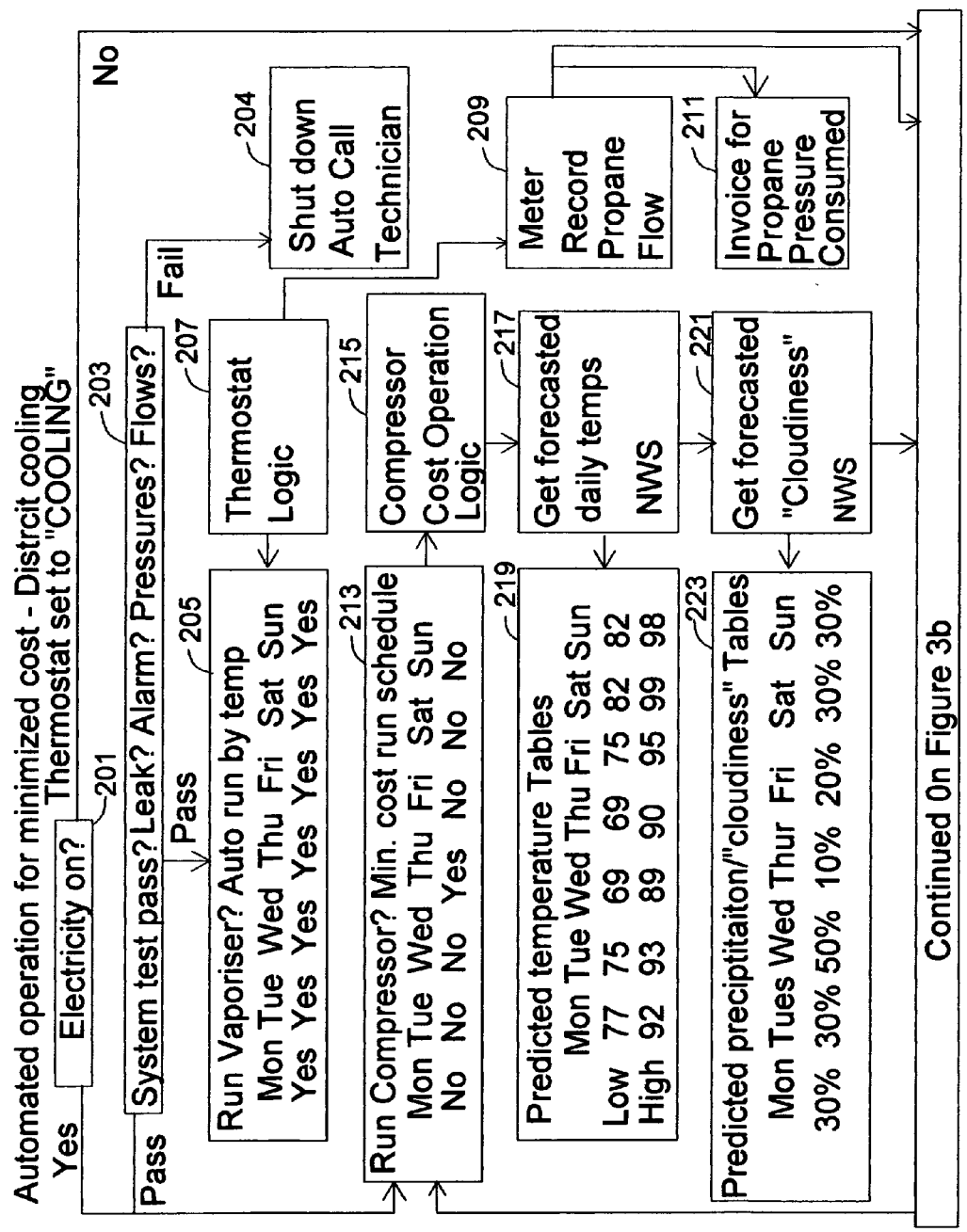
FIG. 3a illustrates elements and processes of the fluid energy system of FIG. 2 in a cooling operation.
Figure 3B:
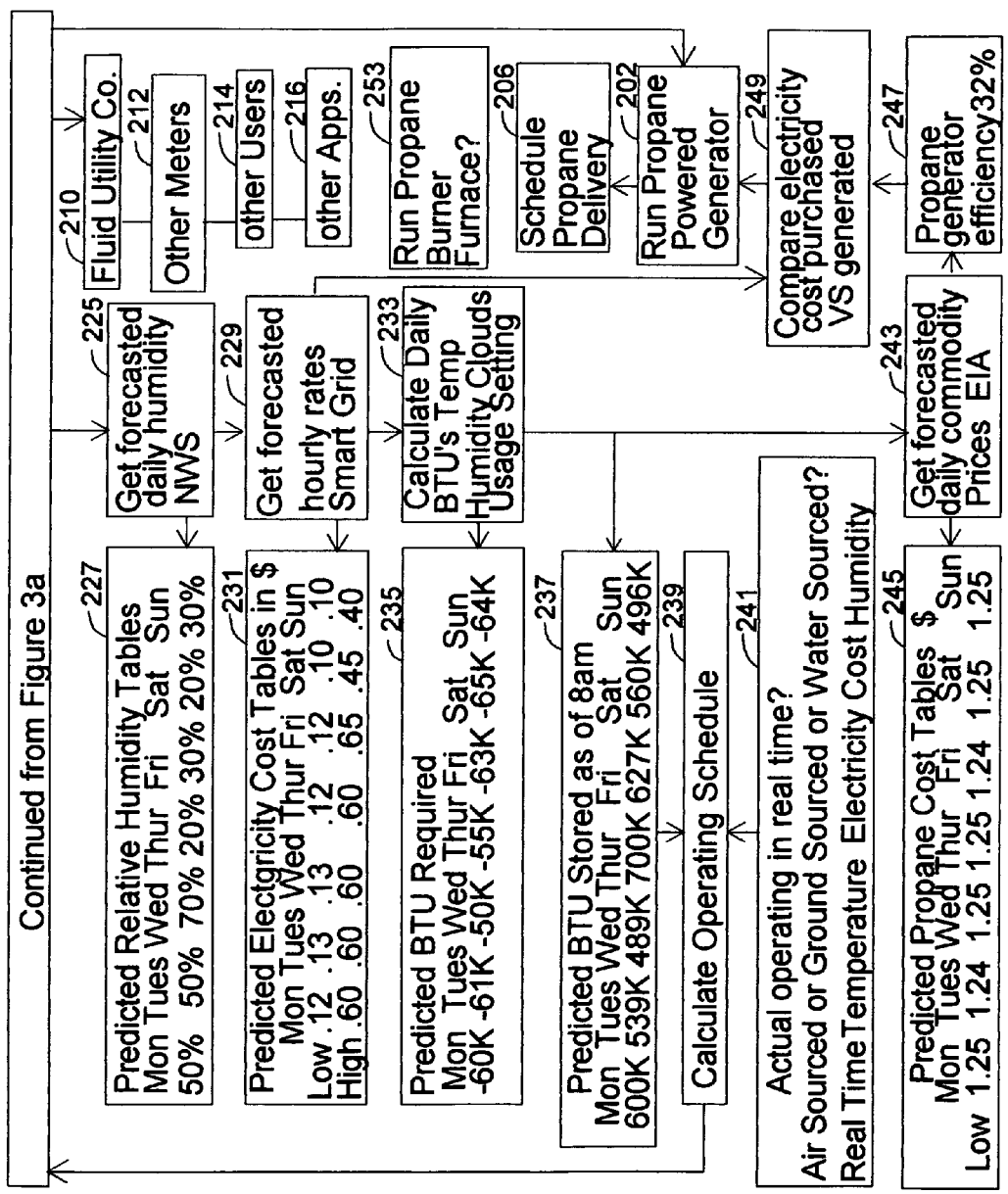
FIG. 3b illustrates elements and processes of the fluid energy system of FIG. 2 in a cooling operation.

FIGS. 3a and 3b illustrates elements and processes of the fluid energy system of FIGS. 1b, and 2 in a cooling operation. These process steps enable safe, efficient, low cost operation of the heat pump system described herein and its integration with other systems that leverage the pressure of the working fluid or burn it according to logic described in FIGS. 3a, 3b, 4a, 4b, and 5. An electricity check 201 is performed as part of a system self check. If the electricity is not present, the system defaults to a back up mode including a run propane powered generator 202 step which includes opening the valves to supply propane to the generator. Having back up power generation capability is mandatory for many buildings including hospitals, and data centers. Using a burnable fuel as the working fluid and energy storage means as in FIG. 2 enables multiple uses and efficiencies. If the electric power grid is down and the system switches over to generator mode, scheduled compressor run times discussed later can be cancelled as long as there are sufficient BTUs of cooling capacity stored within the high pressure side of the variable volume dual pressure storage cylinder 83. Once propane begins to be burned, in a schedule propane delivery 206 step the system will use internet connectivity to automatically place a propane delivery order according to FIG. 5. In any case a system test 203 is performed to ensure safe operation. Failure such as unexpected pressures, carbon dioxide in a building, carbon monoxide in a building, or leaks invoke failure logic 204 including shut down, alarms, and a call to a service technician. A vaporizer run schedule 205 is calculated according to process steps described in FIGS. 3a, 3b, and 4a, 4b. A thermostat logic 207 as is common in the industry dictates specifics about when cooling is required, by contrast to prior systems, when cooling is required, only the vaporizer 27 runs. The pump 23 runs on a separate schedule a described below. It should be noted that when the vaporizer runs, no electricity is required since pressure forces fluid through the vaporizer but when the pump runs, electricity is utilized to elevate the pressure of the working fluid. Much of the logic of FIGS. 3a, 3b, 4a and 4b is drawn toward selecting pump run times to minimize the cost of electricity and maximize efficiency of heat dissipation. Thus the cooling side of the system runs on an as needed basis according to user settings and temperature sensed by the thermostat. Meanwhile the compression side of the system runs on an independent schedule that is dictated by logic according to FIGS. 3a, 3b, and 5 to minimize cost.

When running in cooling mode on a public utility based system, compression of the fluid may be provided by other system users who compressed the fluid as part of a heating function they needed, the compressed fluid then becomes a pressure energy storage commodity to be sold by a public utility company 210 whereby the utility will generate an invoice for pressure consumed 211. The public utility utilizes a propane flow meter 209 to determine the volume of propane a customer transitions from a liquid to a gas and what volume of propane the customer transitions from a gas to a liquid. The utility invoices a customer for propane transitioned to a gas and credits the customer for propane transitioned to a liquid. Other meters 212 being connected to each of the other customers 21 of the utility company that may have building climate control, food refrigeration, or commercial heating and cooling requirements as examples of other applications 216.

A compressor run schedule 213 is the main cost advantage that merits the infrastructure cost investments represented by the working fluid storage architecture of FIG. 2. The compressor run schedule 213 is determined by collecting pertinent data and performing calculations according to the following steps and as described in FIG. 5. A compressor run logic 215 is defined and programmed as described in FIG. 5 to calculate when electricity can be purchased most cheaply and when operating times are most efficient. In order to make these calculations the system of FIG. 5 must go thorough the steps of FIGS. 3a, 3b. A forecasted temperature acquisition 217 involves the system utilizing internet connectivity multiple times each day to gather data and populate a forecasted temperature table 219. Examples of Internet accessible predicted weather data sources include the National Weather Service, http://forecast.weather.gov, and the Weather Channel. This table enables the system to predict how many BTUs of cooling will be required each day over a 7 day period, to ensure adequate cooling BTUs are stored in the high pressure side of the FIG. 2 storage cylinder, and to determine when compression and condenser heat dissipation into an air heat sink can be done most efficiently. Similarly a forecasted precipitation acquisition 221 step is performed and used to populate a forecasted precipitation table 223. Cloudy days require less BTUs of cooling than sunny days but increased humidity decreases efficacy. This table is included in the systems predicting of how many BTUs of cooling will be required each day over a 7 day period, to ensure adequate cooling BTUs are stored in the high pressure side of the FIG. 2 storage cylinder, and to determine when heat dissipation into the air heat sink can be done most efficiently. Likewise, a forecasted relative humidity acquisition 225 is periodically acquired over the internet to populate a forecasted relative humidity table 227.

Figure 5:
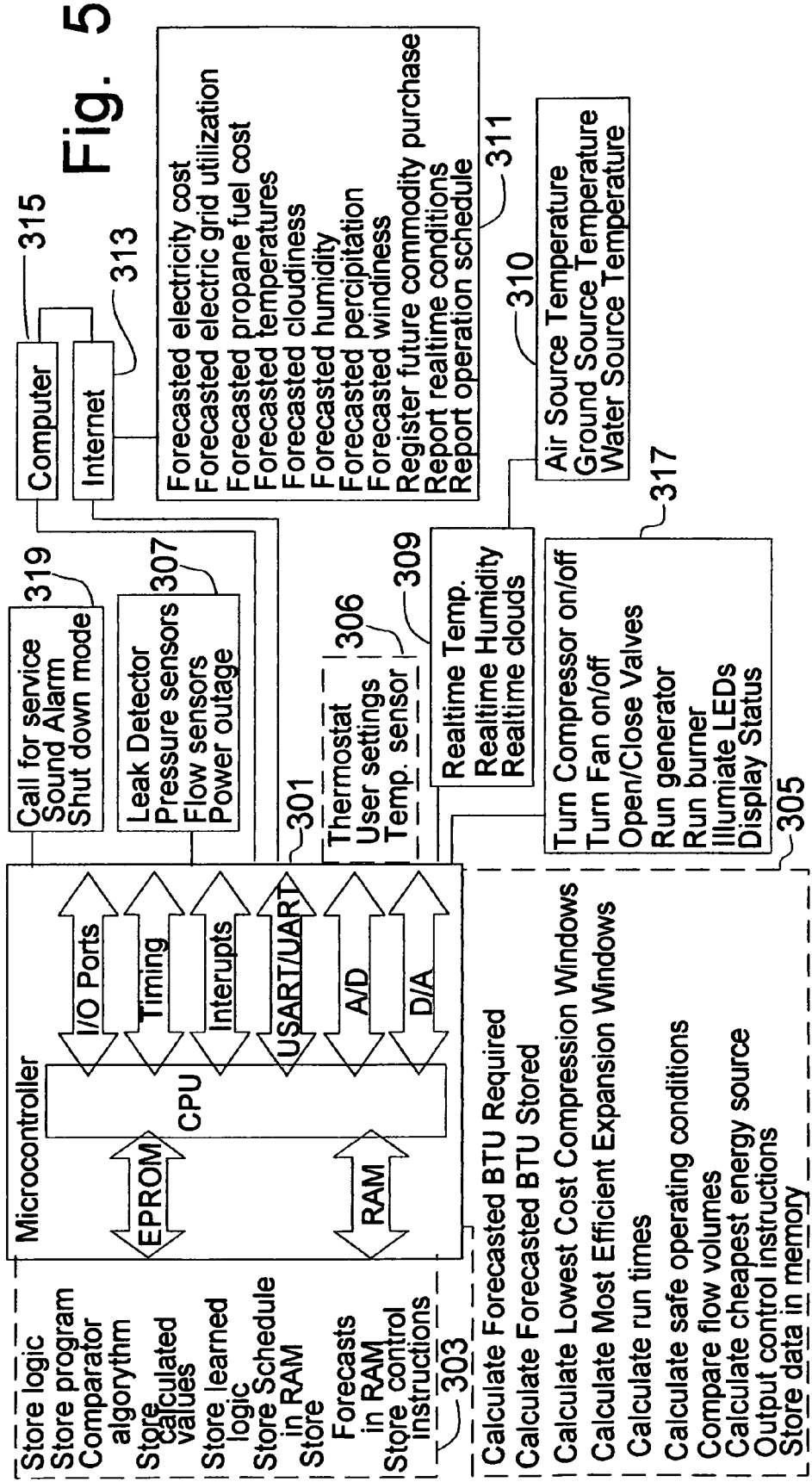
FIG. 5 illustrates control elements including interfaces and processes of the heating and cooling and fluid energy storage system of all Figures.

For a given geography, over the course of 24 hours, electricity costs can vary widely. In some markets, electricity at 4 am on a Sunday may cost 20% of the cost of electricity at 2 pm on a Wednesday. Thus knowing when electricity is cheapest over the course of the week together with the ability to store up to 700,000 BTUs of cooling capacity in the form of liquid propane working fluid enables the system of FIG. 5 to calculate optimal run days and times according to the following process. An acquire predicted electricity cost 229 step is performed in accordance with FIG. 5 and used to populate a predicted electricity cost table 231. Examples of websites that offer or are planning to offer real-time and forecasted electricity costs include GridPoint Inc at http://www.gridpoint.com/solutions/electricvehiclemanagement/ and Google PowerMeter. With the vast enhancement of the so called Smart Electric Grid many more sources of information are becoming available. Calculations are made using the predicted electricity cost table as described in FIG. 5 to ascertain when the lowest cost operation windows are and when to schedule pump operation to ensure adequate BTUs are always available for minimized cost. The above forecasted temperature table, humidity, and cloudiness are used in a calculate BTUs required 233 step which is used to populate a calculated BTU required table 235. Calculated BTU's required, are subtracted from a calculated BTU stored table 237 to ensure at least 200,000 BTUs are always stored as a compressed liquid in the high pressure cylinder of FIG. 2. These tables and logic described in FIG. 5 are used to produce a calculate run schedule 239 to minimize operating cost and optimize efficiency. Calculations also consider a real-time conditions 241 input to test assumptions, learn how to improve forecasted table accuracy, and determine whether conditions have changed such that pump running at any given moment in time is cheaper than pump running at future scheduled pump run times.

Similarly an acquire propane cost 243 step involves using the elements in FIG. 5 to gain from the internet data to populate a propane cost schedule 245. The Wall Street Journal online reports on current and future propane commodity market pricing at http://online.wsj.com. Logic then compares the price of propane multiplied times a generator efficiency 247 assumption to perform a compare electricity cost 249 and determine whether generating electricity by burning propane to sell on the electric grid or to power systems locally is cheaper than the cost of buying electricity from an electric utility. If propane electricity is cheaper, the propane burning generator is engaged and an order for more propane is place to replenish that which will be burned. Similarly as in FIGS. 4a and 4b logic will determine whether a run propane burner 253 step makes sense for example when electrical power service is interrupted or heating by burning propane is cheaper than heating with the heat pump.

Figure 4A:
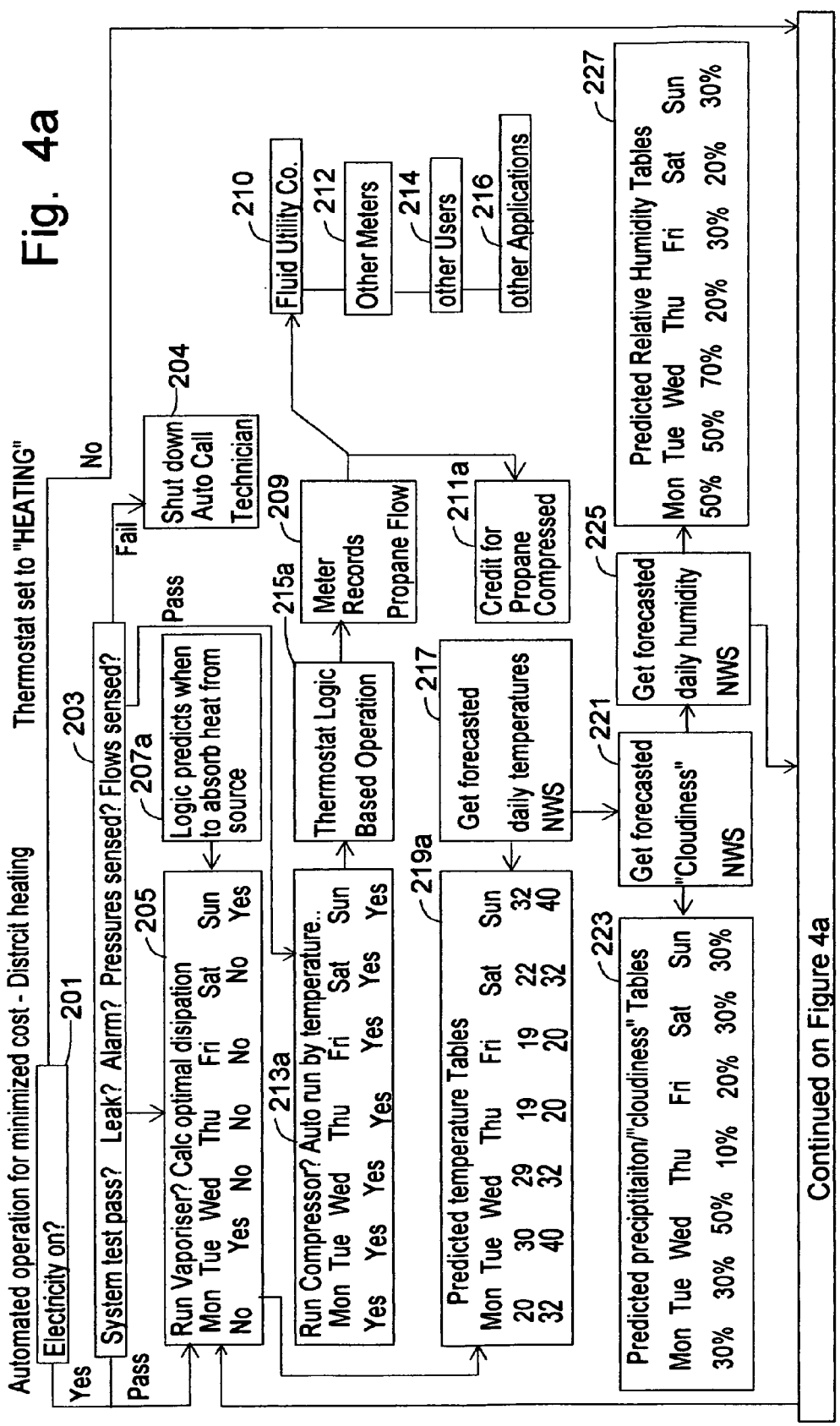
FIG. 4a illustrates elements and processes of the fluid energy system of FIG. 2 in a heating operation.
Figure 4B:
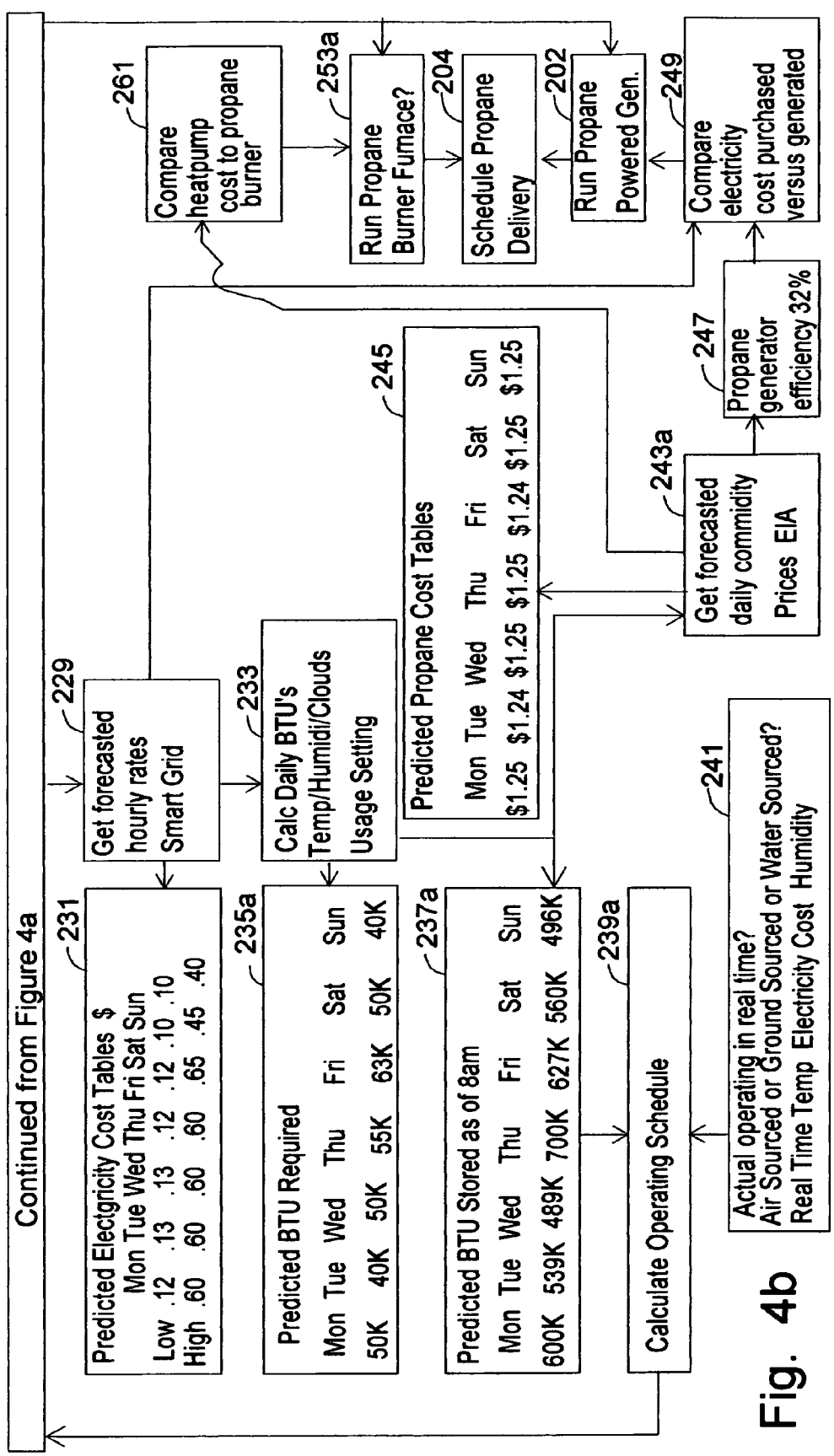
FIG. 4b illustrates elements and processes of the fluid energy system of FIG. 2 in a heating operation

FIGS. 4a and 4b illustrates elements and processes of the fluid energy system of FIG. 2 in a heating operation. As mentioned in FIGS. 3a and 3b logic including a compare costs 261 step will determine whether the run propane burner 253 step makes sense for example when heating by burning propane is cheaper than heating with the heat pump. FIGS. 3a and 3b described the system of FIGS. 1b, 2, and 5 in heating mode. FIGS. 4a and 4b describes the system of FIGS. 1a, 2, and 5 in cooling mode. The switching between modes can be performed automatically or manually by a user switch selecting either the heat or cool setting on the thermostat connected to the microprocessor of FIG. 5. When set to the cooling mode, an alternate thermostat logic 207a is required to determine when to operate the pump and when to operate the vaporizer, as in FIGS. 2, 3a and 3b they can be operated asynchronously each according to separate logic. Whereas the user of cooling in FIGS. 3a and 3b was compressing the working fluid and wasting the phase change heat into the environment and in so doing exchanging electricity for a stored capacity to cool a building. The user in FIGS. 4a and 4b is compressing a fluid for the purpose of extracting the phase change heat to heat a building and the capacity to cool is wasted.

Alternately, in a utility service company based model, oftentimes the heat output from one customer can be utilized by a different customer and the capacity to cool output from one customer can be utilized by a different customer, and in such cases neither heat output nor the capacity to cool are wasted to the environment. Thus the utility pays or gives a credit for pressure produced 211a to the customer such as in FIGS. 4a and 4b who is performing a heating function and sells to the utility energy produced in the form of a pressurized liquid fluid with the capacity to cool for a different customer.

When operating independently and not as part of a utility, the operational steps of FIGS. 4a and 4b utilize the logic and hardware of FIG. 5 to calculate an alternate vaporizer run schedule 213a when the vaporizer will run according to a vaporizer run logic 215a that optimizes the vaporizes ability to absorb heat from the heat sink according to the temperature of the heat sink and air humidity when the air source heat sink is utilized. This prevents the vaporizer from freezing up from condensate thereon for example. As previously described, heat sinks for the system described in this application can include air, ground, water, or real time selecting between a multitude of available heat sinks to optimize performance. The logic utilizes inputs such as an alternate forecasted temperature table 219a which is utilize din calculating an alternate calculated BTU required table 235a, and an alternate calculate BTU stored table 237a. Also many of the steps described in FIGS. 3a and 3b to determine when to run the compressor are also utilized in FIGS. 4a and 4b to determine when to run the vaporizer according to a calculated alternate calculate run schedule 239a step. It is possible that propane burner operating costs per BTU may sometimes be lower than electric heat pump operating costs per BTU an alternate acquire propane cost 243a step is performed to provide the data needed to calculate if burning propane is cheaper in which case an alternate run propane burner 253a step will be taken.

FIG. 5 illustrates control elements including interfaces and processes of the fluid energy storage system of FIGS. 3a, 3b, 4a, and 4b as well as FIGS. 6a, 6b, 7, 10, and 11. A microcontroller 301 includes the required elements and interfaces to collect data, execute calculations, and control operation of elements and steps in all Figures throughout this application. The microcontroller is integrated during manufacture with stamped circuits 306 including a thermostat user interface for inputting user settings, and a temperature sensor. The microcontroller includes embedded RAM memory that is programmed with logic that forms the basic operations of the microcontroller. The microcontroller includes a programmable memory to store data tables and store logic and formulas. Prior to operation, the RAM and programmable memory comprise memory functions 303 that includes programming of memory with stored logic, controlling program instructions, and comparator algorithms. During operation the memory functions 303 are used by the CPU to store calculated values, store learned logic, store calculated schedules, store forecasts that are acquired externally, and to store controlling instructions and data.

The microcontroller includes a CPU for performing processing steps 305 that control operations, populates the data tables, calls to data tables, calls to external data, and processes the logic including performing calculations that optimize operational efficiency of the system. In addition to coordinating logic steps, the CPU performs calculations to optimize system performance and minimize cost and energy consumption including, calculating forecasted BTUs required over a 1 week future time period, calculating forecasted BTUs stored at any given point in time over a 1 week time period, calculating lowest cost fluid compression windows, calculating most efficient expansion windows, calculating run time schedules 1 week in advance, calculating that safe operating conditions are always present, comparing flow volumes measured to flow volumes calculated, calculating the cheapest energy source, outputting control instructions based upon calculations, and controlling as in FIGS. 9, and 10 whether to use wind powered compression or electric powered compression.

The microcontroller includes input/output ports to interface with external devices such as failure outputs 319 that are triggered when an interrupt sequence occurs such as a system failure which causes a shut down of all valves the sounding of an alarm and an automated call to a service technician wirelessly or over the internet. Such a system failure may be sensed through sensor inputs 307 which are connected to the microcontroller such as a leak detector, pressure sensors, flow sensors, carbon dioxide sensor, carbon monoxide sensor, and a power outage sensor. High priority inputs can cause interrupts to other processes due to their higher priority. A real-time inputs 309 connectivity includes input such as real time temperature within the building and within real-time heat sinks 310 such as air source, ground source, and water source, real-time outside humidity, real-time cloudiness each of which are including in calculating real BTU loads and also cheapest operating times. The microcontroller includes a serial port to enable internet inputs and outputs 311 such as gathering forecasted electricity cost, forecasted electric grid utilization, forecasted propane fuel cost, forecasted temperatures, forecasted cloudiness, forecasted humidity, forecasted precipitation, forecasted windiness, registration of future commodity purchases, reporting real time conditions, reporting operation schedule, reporting historic system usage, and calling for service. The serial port may be able to connect directly to an internet 313 or indirectly to the internet through a computer 315. Outputs from the microcontroller include signals to a set of controlled devices and processes 317 including turning on and off the compressor, turning fans on and off, opening and closing the valves, turning the generator on and off, turning the burner on and off, turning the electric motor of FIG. 9 on and off, illuminating LEDs to indicate status, and displaying status on a display screen.

The microcontroller includes analog to digital and digital to analog converters to support a range of input and output interfaces. The microcontroller also includes a timer to ensure that processes are attended to on a timely basis and steps are executed logically.

Propane burner logic (to be used when thermostat set to "Heat" and not to be used when thermostat set to "Cool"). At present and at each future point in time for a period 7 days in the future, calculate whether to burn propane. Get price of electricity forecast from internet, populate predicted electricity cost table 231. Get price of propane forecast from internet, populate propane cost schedule 245 table.

Electricity Price for propane heat pump per million BTU $$(MBTU) \text{heat equals(price of electricity/mbtu)/(COPS)} = EPM$$

Propane Price for propane burner per million BTU heat equals(price of propane/mbtu/(burner efficiency)=PPM Is EPM>PPM? if yes schedule turn off heat pump and turn on propane burner.

Propane generator logic. At present and at each future point in time calculate whether to burn propane to generate electricity.

Is power out? If yes turn on propane generator.

Get price of electricity forecast from internet, populate predicted electricity cost table 231. Get price of propane forecast from internet, populate propane cost schedule 245 table.

Cost to buy electricity=CBE

Cost to generate electricity=CGE

CBE populated from internet electric GRID data.

$$\text{CGE calculated as Propane Price for propane burning generator(price of propane/mbtu/(generator burn efficiency)} = CGE$$

Is CBE>CGE? if yes schedule turn on propane burning generator.

If hourly costs forecasted to purchase electricity or propane consistently vary from hourly cost actually incurred, learn to adjust future hourly cost forecasts by a consistent deviation variable.

Calculate BTUs needed for cooling (7 Day cooling load for building)

Get weather forecast for 7 days from internet, populate tables.

Get hourly forecasted temperature, populate forecasted temperature table 219.

Get hourly forecasted humidity, populate forecasted relative humidity table 227

Get hourly forecasted cloudiness, populate forecasted precipitation table 223.

Get hourly forecasted windiness, populate forecasted windiness table.

BTUs required hourly assigned variables HOUR1, HOUR2, . . . HOUR168

$$HOUR1=((0.75 \times 1^{st} \text{ hour temperature})+(0.1 \times 1^{st} \text{ hour humidity})+(0.2 \times (1/1^{st} \text{ hour daytime cloudiness factor}))+(0.1 \times 1 \text{st hour windiness factor})) \times \text{Average BTUs/hour}=\text{Calculated BTUs}$$

Cooling required for HOUR1

Perform similar estimate for hours 2 through 168. Populate calculated BTU required table 235. Add hour calculated BTUs to calculate daily BTUs needed forecast, assign to variables DAY1, DAY2 . . . DAY7

For each of temperature, humidity, cloudiness, and windiness, the above formula includes first a weighting then a numerical variable. As the system operates it can compare actual BTUs used compared to calculated BTUs to tweak either the weights, or the weather forecasts, or the average BTUs/hr to improve accuracy in calculations.

When executing cooling function, CPU compares estimated weather forecast to actual weather forecast and where a consistent deviation is present adjusts future forecasts by a variable thereby learning a more accurate weather forecast simulation process. For example if actual temperature is 5 degrees cooler on average, the system will learn to subtract 5 degrees from future weather forecast data pulled from the internet. Forecasted weather compared to actual weather can consistently and predictably vary in certain scenarios for example when the system is located at a different elevation than the weather forecasting/reporting station.

When executing cooling function, CPU compares calculated BTUs for HOUR1 to actual BTUs needed in the first hour and where a consistent deviation is present adjusts the formula thereby learning a more accurate calculation formula for example respective weights assigned to temperature, humidity, cloudiness, and windiness.

Calculate cooling BTUs available at each future point in time, and populate calculated BTU stored table 237.

Cooling BTUs in liquid storage cylinder=LSDAY1, LSDAY2, . . . LSDAY7

LSDAY2=LSDAY1−DAY1+PBTU1,
LSDAY3=LSDAY2−DAY2+PBTU2, etc.

Where PBTU1, PBTU2 . . . PBTU7 are BTUs pumped and stored each day, and populated in a table as below.

Pump Running Parameters

Real time Stored BTU=SBTU, SBTU is not allowed to go below 200,000 BTU

If SBTU<200,000 then run compressor
If SBTU>700,000 then stop compressor

Calculate cheapest pump running times according to predicted electricity cost table 231 of FIGS. 3a and 3b. Get price of electricity forecast from Internet, populate table in forecasted hourly costs.

Cost to buy electricity hourly for 1 week=CBE1, CBE2, CBE3 . . . CBE168

Compare CBE1 to CBE2 to . . . CBE 168, rank lowest to highest

Saturday and Sunday have electricity cost windows as low as $0.10/kwh. The pump running schedule can be based upon this fact alone, cheapest cost of electricity approximates cheapest running time. A more complex calculation especially suited for air sourced pump and condenser heat dissipation includes the most efficient pump running times based upon weather conditions forecasted as populated above. Calculations include weighted pump and condenser efficiencies when dissipating heat including forecasted temperature table 219, and forecasted relative humidity table 227. The pump and condenser efficiency performance formula is inversely proportional to heat sink source temperature. When pump running calculations include the low night time temperature of 69 degrees on Thursday together with the low humidity on Thursday, the system calculates a compressor run schedule 213 whereby, due to weather efficiencies, it is cheaper to run the compressor on Thursday at the $0.12/kwh electricity cost than it is to run the compressor on Saturday or Sunday at the $0.10/kwh. The compressor run schedule 213 is populated accordingly including scheduled hourly and daily pumped and stored BTUs with variables assigned such as Day 1=PBTU1 as used above for keeping track of stored BTUs to ensure there will always be enough planned BTUs available to accommodate the calculated building cooling load according to the weather forecast, calculated BTU usage in the future and calculated BTUs to be produced and stored according to the calculated compressor pump run time schedule. Thus predicted stored BTUs on Thursday at 700,000 which is full capacity of the high pressure storage cylinder.

AVG btu stored per hour is a pump specification=BTU/HR and in this system the pump can produce 30,000 BTU/hr of cooling capacity.

Calculate number of pump running hours needed for 1 week according to weather forecasts. 418,000 BTUs are calculated to be needed according to the calculated BTU required table 235 which equates to 13.9 hours of pump run time required to fulfill the building cooling load for the week.

Figure 6A:
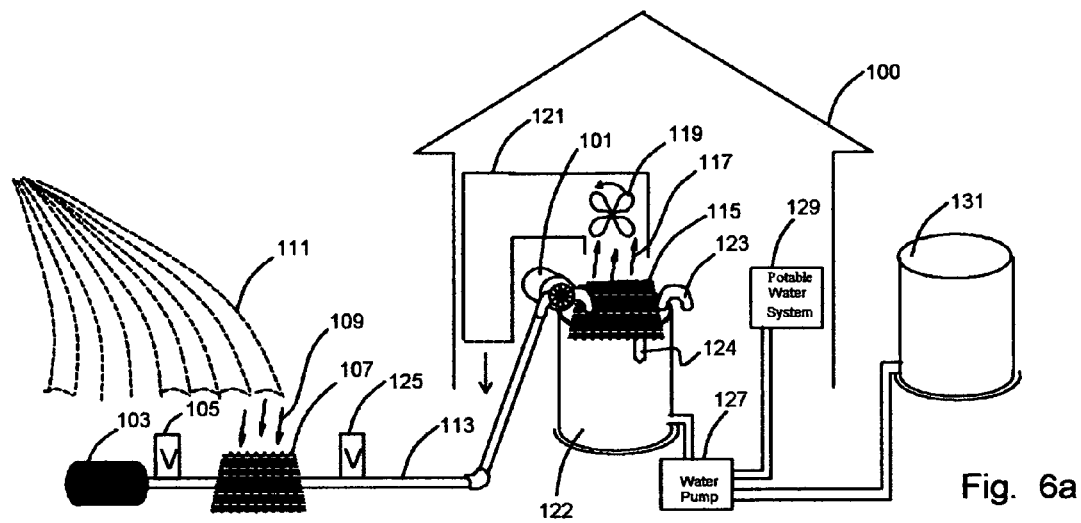
FIG. 6a illustrates the elements and processes of a building heating system with a cogeneration desalinated water output.

FIG. 6a illustrates the elements and processes of a building heating system with a cogeneration desalinated water output. Water is taken from a salt water 111 source such as an ocean or from another non-potable water source such as a lake or river. The vacuum to pull the salt water is provided by a vacuum pump 101 which is capable of converting an energy input such as electricity or wind into a pressure of 0.2 PSI where a water liquid to water vapor phase change occurs at 54 degrees Fahrenheit. In any case, when potable water is an output, an oil-less pump is utilized. The water enters the system through a particulate filter 103 which filters out nearly all non dissolved matter, when water intake is initiated a vacuum valve 105 is open to let water enter a vaporizing coil 107, the vacuum valve 105 then closes to enable the vacuum pump 101 to lower the pressure within the vaporizing coil 107 to be 0.2 such that water within the vaporizing coil 107 undergoes a phase change from a liquid to a gas. This phase change requires heat absorption from a salt water source heat 109 which serves as a heat sink to contribute heat to the phase change. A vacuum pipe 113 communicates the low pressure from the vacuum pump 101 to the vaporizing coil 107 and communicates the water vapor from the vaporizing coil 107 to the vacuum pump 101 which pushes it into a condensing coil 115 where the water vapor gas undergoes a phase change from gas to liquid giving off heat 117 in this process. The heat 117 is pulled by a heat fan 119 into a building duct 121 where it is distributed throughout a heated building 100 to warm the heated building. Water flows from a condensate pipe 124 after the phase change in the condensing coil 115 and then collects in a water drip tank 122 which is open to atmospheric pressure via a hydrophobic membrane port 123 which enable air to pass there through but does not allow moister to pass such that the water drip tank 122 accumulates potable water which can be pumped by a water pump 127 for distribution through a potable water system 129 within the heated building and for storage within a water storage tank 131. Periodically the vaporizing coil 107 and the particulate filter 103 will need to be back flushed or replaced. A vacuum preserving valve 125 enable these elements to be sealed off from the vacuum pipe 113 such that the vacuum therein can be preserved to conserve energy utilized to create the vacuum therein while elements are serviced.

Thus the art of FIG. 6a encompasses an apparatus and process for applying an electrical energy (or mechanical energy as in FIG. 9) for the purposes of extracting thermal energy from a body of water via a first phase change, transporting the thermal energy into a heating application such as a building via a second phase change, with the heat output exceeding a Coefficient of Performance of 1, while concurrently utilizing the same electrical or mechanical energy and apparatus to perform water desalination thereby producing a potable water supply as a by-product. According to ASHRAE, water as utilized above has a COP of 4.1. For every 1 million BTUs of heat output, desalinated water output is 113 gallons.

Figure 6B:
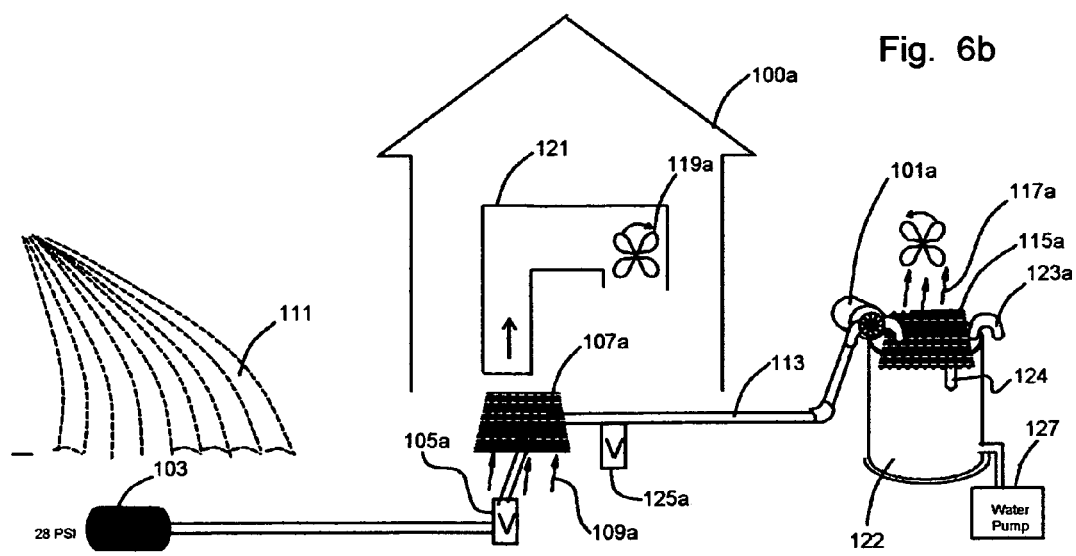
FIG. 6b illustrates the elements and processes of a building cooling system with a cogeneration desalinated water output.

FIG. 6b illustrates the elements and processes of a building cooling system with a cogeneration desalinated water output. An alternate vacuum pump 101a creates a vacuum in the vacuum pipe which communicates the vacuum through a home cooling evaporation coil 107a, an alternate vacuum valve 105a, and the particulate filter 103. Initially the vacuum draws water into the home cooling evaporation coil 107a at which time the vacuum valve 105 closes to increase the vacuum to 0.2 psi such that at 54 degrees water in the home cooling evaporation coil 107a undergoes a phase change from a liquid to a water vapor gas and wherein home sourced heat 109a is absorbed by the phase change being extracted from the building via cooled air that is pulled by the cooling fan 119a into the building duct 121 where it is distributed throughout a cooled building 100a to cool the building. The water vapor leaves the home cooling evaporation coil 107a, passing through the alternate vacuum pump 101a which pushes it into an air source condensing coil 115a, where it condenses from a vapor back to a liquid giving off an alternate heat 117a which is absorbed by a heat sink such as air source, ground source, or water source. Water from the condensing coil 115*a* flows in the water drip tank 122 which is at atmospheric pressure in communication with the air via an alternate hydrophobic membrane port 123*a* that air can pass through but water vapor can not pass through. Thus potable water is a byproduct which can be pumped by the water pump 127 for distribution through the above potable water system Periodically the home cooling evaporation coil 107*a* and the particulate filter 103 will need to be back flushed or replaced. An alternate vacuum preserving valve 125*a* enables these elements to be sealed off from the vacuum pipe 113 such that during servicing the vacuum therein can be preserved to conserve energy utilized to create the vacuum therein. According to ASHRAE, water as utilized above has a COP of 4.1. For every 1 million BTUs of heat absorption, desalinated water output is 113 gallons.

Thus the art of FIG. 6*b* encompasses an apparatus and process for applying an electrical or mechanical energy (as in FIG. 9) for the purposes of extracting water from a body of water, transporting it to a proximity to a building and causing it to undergo a first phase change for absorbing thermal energy from the building with a Coefficient of Performance of greater than 1, while concurrently utilizing the same electrical or mechanical energy and apparatus to perform water desalination thereby producing a potable water supply as a cogeneration by-product.

FIG. 7 illustrates a building heating and cooling system having a salt water heat sink source and with a cogeneration desalinated water output. The apparatus and processes of FIG. 7 comprise the building heating/desalination system of FIG. 6*a*, with some elements of the building cooling/desalination system of FIG. 6*b*, and the heat pump elements of FIGS. 1*a*, and 1*b*. The essence of the system of FIG. 7 is a heat pump for building heating applications and for building cooling applications and where potable water is a byproduct "free" cogeneration output. The art of FIG. 7 enables a heat transfer system to switch between a variety of heat sources and heat sinks to optimize efficiency depending upon environmental conditions and whereby water is the working fluid. The system comprises a submerged heat pump 21*b* and a building side heat pump 21*c*. Note, while in the illustration the building side heat pump shows two vaporizers and two compresses, it actually comprises only one vaporizer and one compressor which (depending upon whether they are in heating mode of cooling mode) as in FIGS. 1*a* and 1*b* are able to interface with either the building or an air or ground source heat sink depending upon whether the building is to be heated or cooled. Thus the elements in the building side heat pump appear twice having the same respective numbers but actually representing two different operating modes for the same elements. The submerged heat pump 21*b* having elements to exchange thermal energy with a water source, and the building side heat pump having elements of FIGS. 1*a* and 1*b* to selectively exchange thermal energy with both an air or ground sourced heat sink and with the climate controlled structure 69 depending upon whether in operation to heat or cool the building. To support the operation of the elements of FIG. 7, the microchip of FIG. 5 utilizes three temperature inputs to determine what elements of the submerged heat pump 21*b* and of the building side heat pump 21*c* to include in the water working fluid flow to optimize energy efficiency while performing building heating or building cooling. The three temperature inputs (not shown) include a water source submerged temperature sensor located at the submerged heat pump 21*b*, an air source temperature sensor located at the building side heat pump 21*c*, and a ground source temperature sensor located in a ground sourced heat exchange system (not shown) that interfaces with the building side heat pump 21*c*. During heating operation, microcontroller logic compares the temperature of the three sensors to determine which is warmer and the microcontroller directs water working fluid flow to a vaporizer that sources heat from the warmest of the three heat sources. During cooling operation, microcontroller logic compares the temperature of the three sensors to determine which is coolest and the microcontroller directs water working fluid flow to a condenser to dump heat into the coolest of the three heat sources.

As controlled by the microcontroller, a first vaporizer selection valve 401 in a first setting directs water working fluid flow from the particulate filter 103 to the submerged vaporizing coil 107 including a vacuum valve 105 that allows water into the submerged vaporizing coil and then throttles flow to optimize pressure therein to be 0.2 psi. In a second setting, the first vaporizer selection valve 401 directs water working fluid flow to the home cooling evaporation coil 107*a* which has integrated the alternate vacuum valve 105*a* which allows water to enter and then throttles flow to optimize pressure therein to be 0.2 psi. In heating operation, the first vaporizer selection valve as controlled by the microcontroller directs working fluid water to the submerged vaporizing coil 107 if the temperature sensor there has the higher temperature but will direct water working fluid flow to the home cooling evaporation coil 107*a* if sensors there show a higher air source or ground source temperature. Whatever vaporizer is selected by the microcontroller, the water vapor working fluid is directed by the microcontroller to the condensing coil 115 where energy from the vapor to liquid phase change is directed into the climate controlled building as discussed in FIGS. 1*b* and 6*a*. Thus when heating the building the microcontroller chooses between two vaporizers to optimize efficiency and always the directs flow to the condensing coil 115 to heat the building. Cogenerated water is output as discussed in FIGS. 6*a* an 6*b*. An alternate vacuum pump 101*a* provides the vacuum to pull water through the system when it is in the heating mode similar to the pump of FIG. 6*a*.

During building cooling operations, the microcontroller always places the building side heat pump 21*c* in the cooling configuration as in FIG. 1*b* so cooling thermal exchange is between the building and vaporizer. The microcontroller directs working fluid water flow to cooling evaporation coil 107*a* vaporizer where the phase change from salt water to water vapor absorbs heat from the building to achieve a cooled building 100*a*. When working fluid flow goes through an alternate vacuum valve 105*a*, it throttles flow to maintain a desired pressure with the home cooling evaporation coil 107*a*. By controlling a condenser selection valve 403, the microcontroller directs the working fluid water vapor to which ever condenser has the lowest temperature heat sink source as sensed above. If the salt water heat sink is coolest, the microcontroller directs flow to a water sourced condenser 115*b* and an associated water side vacuum pump 101*b* that does the work to pull a vacuum to pull the working fluid through the system. If the air heat sink or the ground heat sink is coolest, the microcontroller directs flow to the condensing coil 115 and the associated alternate vacuum pump 101*a* that does the work to pull a vacuum to pull the working fluid through the system. In any case, cogenerated water is output as discussed in FIGS. 6*a* an 6*b*.

Stored capacity to cool is described in FIG. 2. A similar architecture can be utilized with FIG. 7 to provide a stored capacity to heat whereby water vapor is stored at a low pressure by moving the movable piston to the left in the storage cylinder of FIG. 2 and when building heat is needed the vapor is controllably throttled up to atmosphere pressure and through a phase change from gas to liquid, absorbing heat in the process. To bring the vapor controllably to atmospheric pressure, the movable piston moves to the right in the storage cylinder of FIG. 2.

FIG. 8*a* illustrates the passive pressure regulated dual pressure storage capability of FIG. 2 in a mobile configuration filled with gas propane. A dual pressure cylinder truck 83*a* includes a truck high pressure valve 36*a* that enables it to receive and deposit propane as a liquid and it has a truck low pressure valve 38*a* that enables it to receive and deposit propane as a gas. These valves enable the truck to interface concurrently with both the high pressure side and low pressure side of the storage tank in FIG. 2. A high pressure truck cylinder 95*a* is depicted as being nearly empty while a low pressure truck cylinder 85*a* is depicted as being nearly full. Thus a high pressure truck piston 99*a*, a truck push rod 26*a*, and a low pressure truck piston 89*a* are shifted to the left. This truck will deliver low pressure fluid to a location that has an excess of stored high pressure fluid and thereby be transformed as described in FIG. 8*b*. A truck wheel 601 enables the dual pressure cylinder truck 83*a* to be hauled over the road and truck legs 602 enable it to sit at a location as needed.

FIG. 8*b* illustrates the passive pressure regulated dual pressure storage capability of FIG. 8*a* filled with liquid propane. A pressure filled cylinder 83*b* comprises a full high pressure truck cylinder 95 and an emptied low pressure truck cylinder 85*a*. The cylinders of FIG. 8*a* arrive to a site such as that of FIG. 2, connects to it concurrently on the high pressure liquid side and the low pressure gas side, filled with propane in a low pressure energy state which it drops off in exchange for propane in a high pressure energy state whereupon it leaves as the pressure filled cylinder 83*b* of FIG. 8*b*. The mechanism for transferring fluid is a slightly higher relative pressure in the low pressure truck cylinder or a slightly lower relative pressure in the high pressure truck cylinder such that without under going a phase change in the transfer, fluid passively flows from the truck's low pressure cylinder to the low pressure cylinder of FIG. 2 and fluid flows from the high pressure cylinder of FIG. 2 into the high pressure truck cylinder. The liquid propane represents a stored capacity to cool that can be transferred from a place not needing a cooling function performed and hauled to a place that does need a cooling function performed. The cooling function performed passively by letting a fluid flow from liquid state to gas state absorbing heat in the process and otherwise with no energy input except hauling. A moved high pressure truck piston 99*a*, a moved truck push rod 26*a*, and a moved low pressure truck piston 89*a* change positions from FIG. 8*a* to FIG. 8*b* to accommodate the passive transfer of propane as above.

Figure 9:
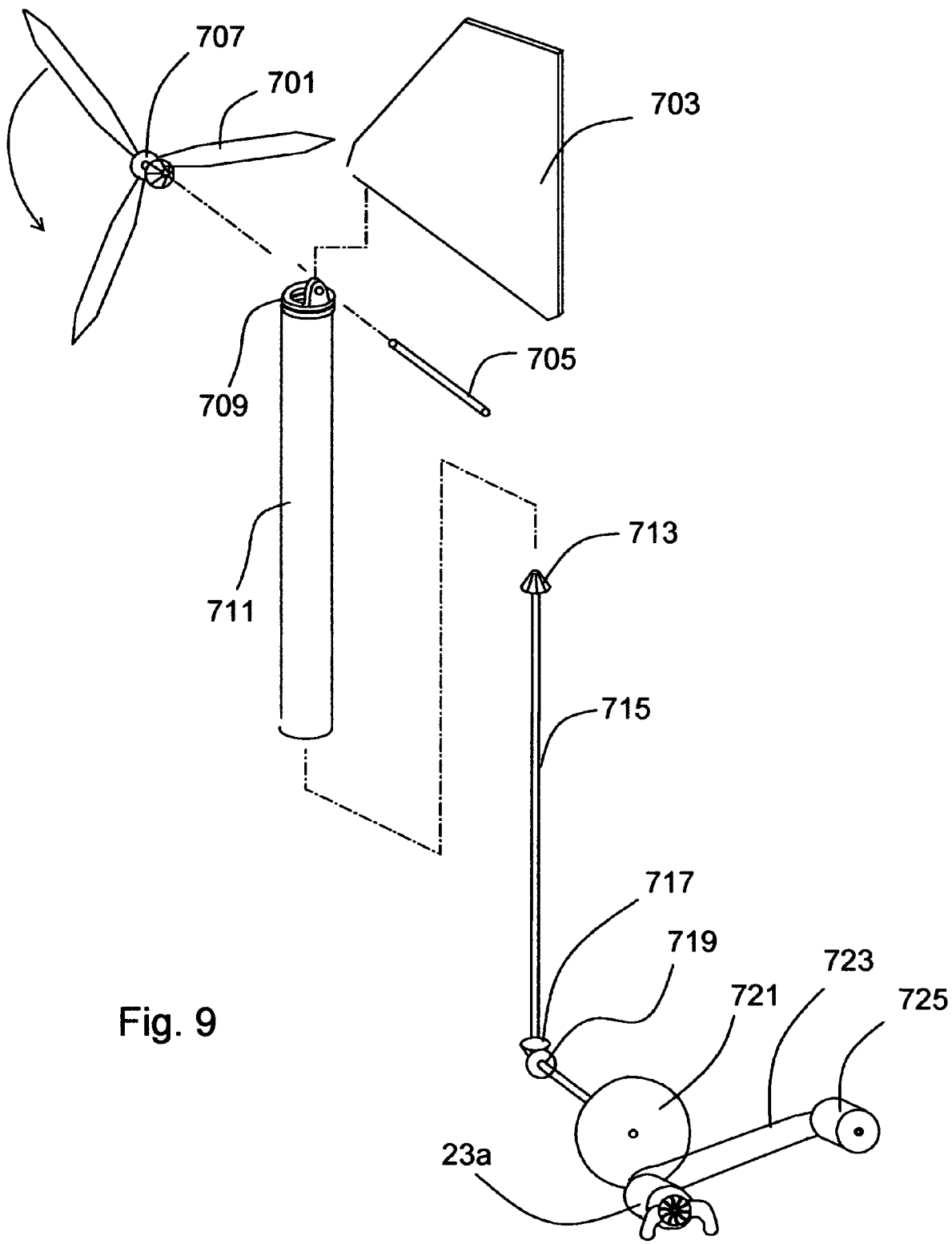
FIG. 9 is an exploded view of a wind powered means to compress propane through a gas to liquid phase change or to expand water from a liquid to vapor phase change.

FIG. 9 is an exploded view of a wind powered fluid pump. When combined with the propane working fluid and pressure energy storage elements of FIG. 2, the wind turbine powers the compressor so that when the wind is blowing propane undergoes a phase change to perform heating and cooling functions in real time. Additionally as in FIG. 2, propane is compressed from a gas to a liquid when the wind is blowing, then stored for use cooling during times when the wind is not blowing. When combined with the elements of FIG. 7*a* the turbine powers a cogeneration building cooling and water desalination process. When combined with the elements of FIG. 7*b* the turbine powers a cogeneration building heating and water desalination process. Thus wind produces a phase change for real time heating and cooling and for storing energy for subsequent heating and cooling through a phase change.

A wind turbine propeller 701 captures energy from wind and transforms it to a rotary energy in a propeller gear 707 affixed thereto which transfers the rotary energy to an upper transfer gear 713, a transfer rod 715, a lower transfer gear 717 assembly which interfaces with a small drive gear 719 which drives a large drive gear 721 which in turn drives a propane pump 23*a* which compresses propane through a phase change from a gas to liquid. The transformation of propane from a gas to liquid is used for building heating, another function, or dumped into a heat sink as previously discussed. In real time, the liquid propane can be expanded to a gas to perform a building cooling or another function. Alternately, the liquid propane can be stored as previously discussed and used subsequently for building cooling. The wind harvested energy being stored in a phase changed liquid working fluid. Energy is stored in the form of propane liquid as in FIG. 2 as a stored capacity to cool. The large drive gear 721 has a pawl and dog (not shown) such that when wind energy is great enough, positive rotational energy from the wind turns the pump to compress the fluid. However, when the wind is not strong enough but real time heating or cooling is needed, an electric motor 725, is switched on by the microcontroller to power the propane pump 23*a*, when the positive rotation of the pump exceeds the positive rotation provided by wind, the pawl and dog allow the pump to rotate freely while the large drive gear 721 coasts without engaging with the small drive gear 719. The electric motor 725 having a clutch that enables it to be engaged only when switched on by the microcontroller in which case a chain drive 723 transmits power from the electric motor to the wind powered propane pump.

A wind blade 703 keeps the wind turbine propeller 701 optimally oriented to captures energy from wind and the interface between the propeller gear 707 the upper transfer gear 713 remains in tact no matter in which direction the wind blade 703 orients the wind turbine propeller 701. The wind turbine propeller 701 rotates around an axle 705 which also affixes the wind turbine propeller 701 and the propeller gear 707 assembly to a rotatable mounting assembly 709 which rotatably affixes the axle 705 to a hollow turbine pole 711. Bearings provided within the propeller gear 707 enable it to rotate around the axle 705 and bearings within the rotatable mounting assembly 709 enable the wind blade 703 and wind turbine propeller 701 to rotate into different orientations around the hollow turbine pole 711. The hollow turbine pole 711 includes bearing that rotatably receive the upper transfer gear 713, a transfer rod 715, a lower transfer gear 717 assembly. The hollow turbine pole 711 is affixed to the ground to provide adequate support. Propeller speed is measured using a magnetic induction sensor (not shown) and is reported to the microcontroller.

Figure 10:
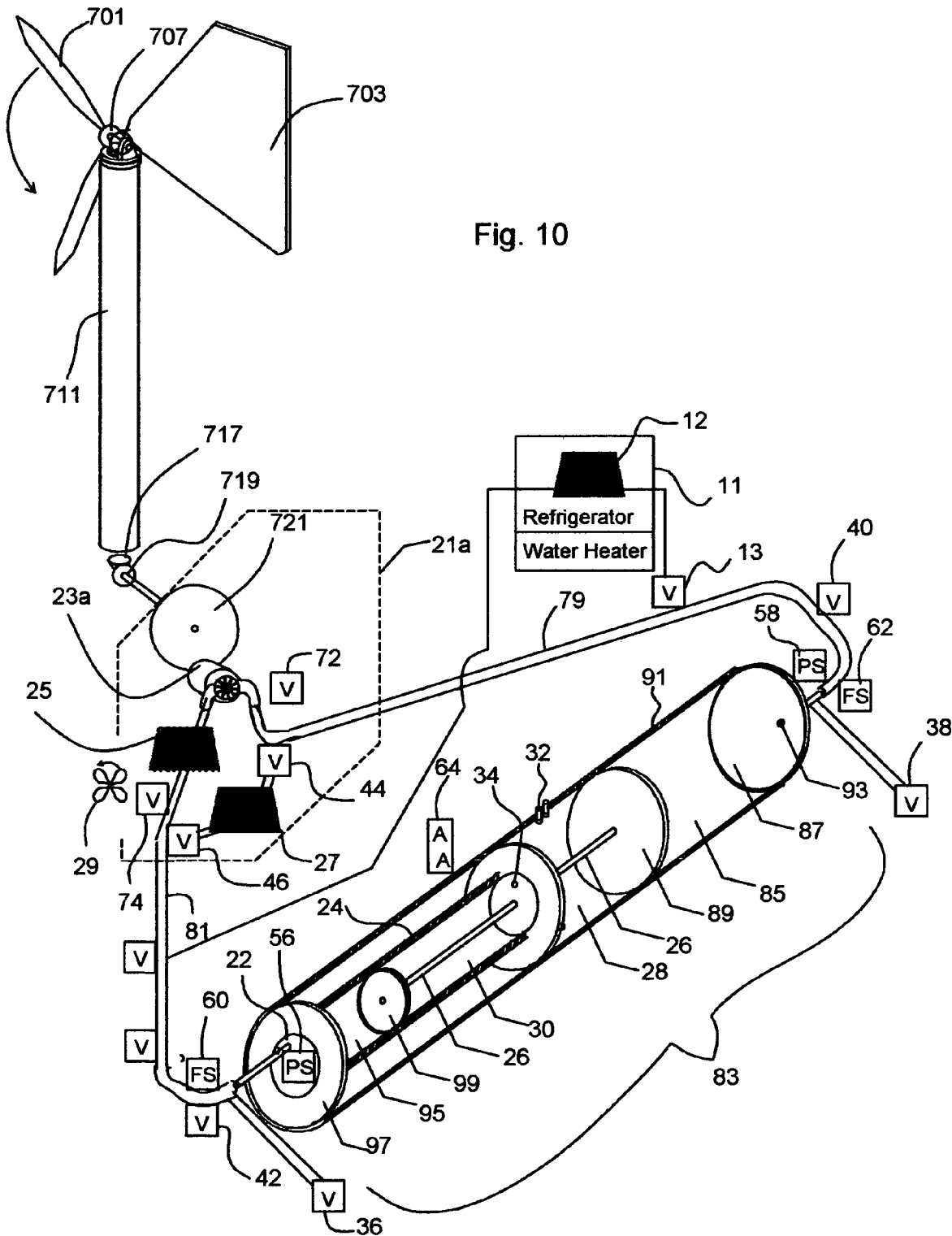
FIG. 10 illustrates the wind powered pump of FIG. 9 integrated with the fluid storage means of FIG. 2.

FIG. 10 illustrates the elements of FIG. 9 used to power the elements of FIG. 2. As previously discussed, the phase change of propane from a gas to a liquid is a means to store energy in the form of the capacity to cool. Storing wind energy in the form of a phase change for subsequent cooling is highly efficient.

Storing the capacity to heat can similarly be achieved using the art of FIG. 10 whereby the working fluid is water. After water is vaporized according to FIG. 6*a*, the low pressure vapor can be stored in the low pressure side of the cylinder of FIG. 10 as a stored capacity to heat. At a subsequent time, the vacuum is allowed to be diminished by moving the sliding cylinder piston to the right where upon the water vapor controllably undergoes a pressure change toward atmospheric pressure and a corresponding controlled phase change back to liquid, emitting heat in the process to heat a building. Heat will occur at the cylinder (instead of at the vaporizer) and if water Ito be utilized in this way, the cylinder can be located within the building such that heat emitted from conversion of water vapor to water liquid within the cylinder is dumped into the building. Thus the system described herein can store energy in the form of a phase change to gas for the capacity to passively heat as well as storing energy in the form of a phase change to liquid for the capacity to passively cool. Generally, fluids that are liquid at room temperature and atmospheric pressure are better suited to passive heat storage and energy recovery while fluids that are gas at room temperature and atmospheric pressure are better suited to passive cooling storage and energy recovery. Many fluids are suitable for use herein.

Figure 11:
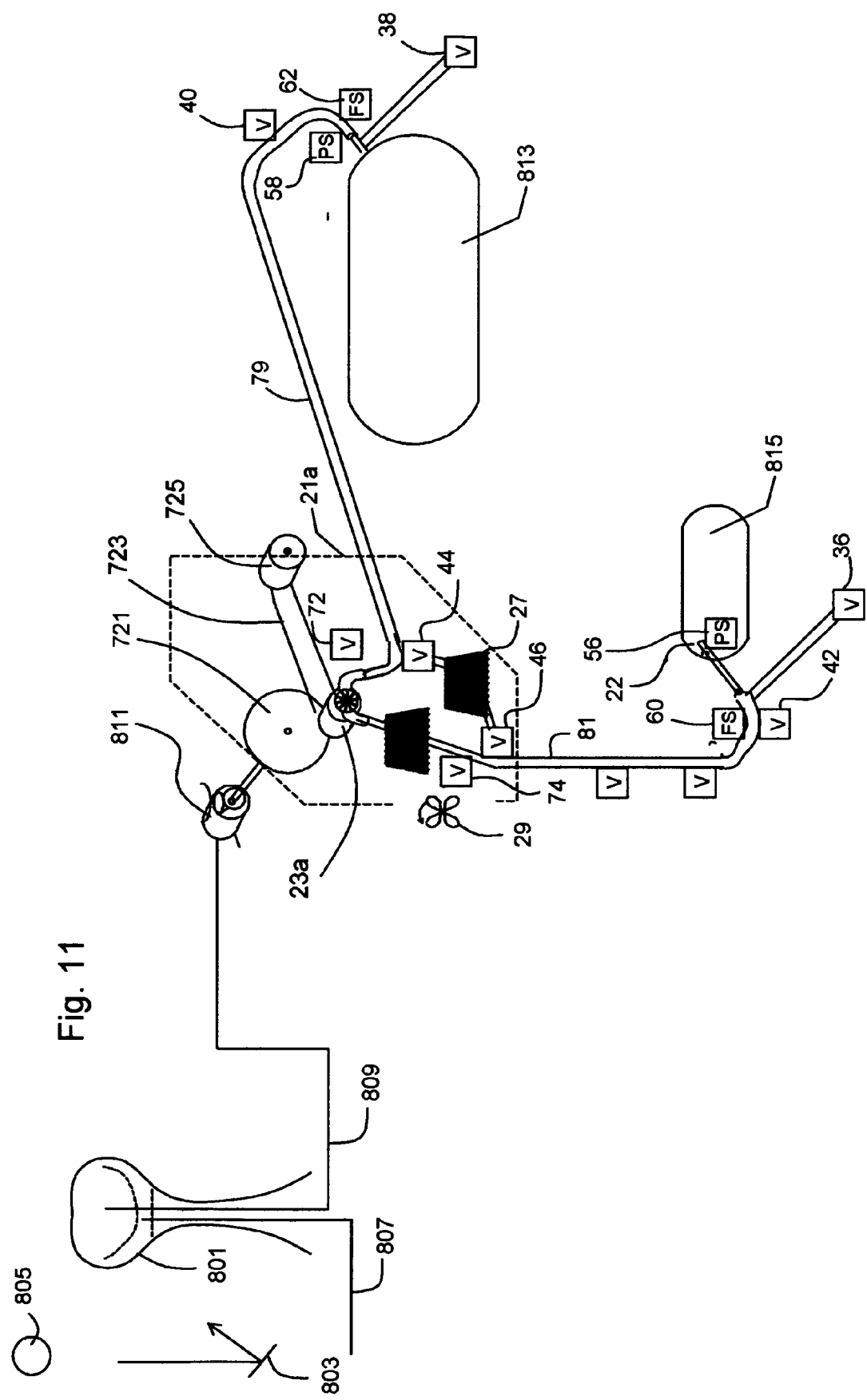
FIG. 11 illustrates a solar heat powered means to compress propane through a gas to liquid phase change or to expand water from a liquid to vapor phase change together with a liquid working fluid storage means and a gas working fluid storage means.

FIG. 11 illustrates a solar heat powered means to compress propane through a gas to liquid phase change or to expand water from a liquid to vapor phase change together with a liquid working fluid storage means and a gas working fluid storage means. A water tank 801 holds water supplied by a water pipe 807 where a solar energy reflector 803 can reflect solar energy 805 to be incident upon the surface of the water tank 801 so as to heat the water therein from a liquid state to a gas state. A throttle valve (not shown) controllably allows steam to exit the water tank via a steam pipe 809 were the steam pressure causes a steam powered turbine 811 to rotate which powers the propane pump 23a which compresses propane from a gas propane tank 813 through a phase change and pumps it into a liquid propane tank 815. Other elements of FIG. 11 operate as previously discussed.

Thus when the sun is shining, propane can be compressed for use in real time building heating. Also when the sun is shining after compression to a liquid, the propane can then be passed in real-time through a vaporizer for real time building cooling. Propane that is compressed when the sun is shining and stored in the liquid propane tank 815 represents a stored energy capacity to cool that can be used at any subsequent time whether or not the sun is shinning as previously discussed herein.

Storing the capacity to heat can similarly be achieved using the art of FIG. 11 whereby the working fluid is water. After water is vaporized according to FIG. 6a, the low pressure vapor can be stored in the gas propane tank 813 as a stored capacity to heat. At a subsequent time, the vacuum is allowed to be diminished where upon the water vapor controllably undergoes a pressure change toward atmospheric pressure and a corresponding controlled phase change back to liquid, emitting heat in the process to heat a building. Thus the system described herein can store energy in the form of a phase change to gas for the capacity to passively heat as well as storing energy in the form of a phase change to liquid for the capacity to passively cool. Generally, fluids that are liquid at room temperature and atmospheric pressure are better suited to passive heat storage and energy recovery while fluids that are gas at room temperature and atmospheric pressure are better suited to passive cooling storage and energy recovery. Many fluids are suitable for use herein.

The liquid propane tank and gas propane tank of FIG. 11 are interchangeable with the passive storage system of FIG. 2 and elsewhere in this application.

OPERATION OF THE INVENTION

Operation of the invention has been discussed under the above heading and is not repeated here to avoid redundancy.

CONCLUSION, RAMIFICATIONS, AND SCOPE

Thus the reader will see that the apparatus and processes of this invention provides an efficient, energy saving, greenhouse gas reducing, thermal pollution reducing, novel, unanticipated, highly functional and reliable means for heating and cooling buildings.

While the above description describes many specifications, these should not be construed as limitations on the scope of the invention, but rather as an exemplification of a preferred embodiment thereof. Many other variations are possible.

What is claimed:

1. An energy storage means comprising;
   a compressor,
   a gas working fluid,
   a liquid working fluid storage means,
   a building,
   whereby an energy source and a time are selected from the group consisting of;
      electricity energy and a time determined by computer logic to operate said compressor when electricity cost is cheapest,
      electricity energy and a time determined by computer logic to operate said compressor when environmental conditions are calculated to minimize cost,
      electricity energy and a time determined by computer logic to operate said compressor when environmental conditions are calculated to maximize efficiency,
      solar energy and a time to operate said compressor when captured solar energy is enough to power said compressor,
      and wind energy and a time to operate said compressor when captured wind energy is enough to power said compressor,
   and at the time selected, using said energy source, said compressor is powered for the purpose of transforming said gas working fluid to become a liquid working fluid which is then stored in said liquid working fluid storage means,
   and at a time subsequent to said time selected, when said compressor is not powered, said liquid working fluid is phase transformed from a liquid state back to a gas state and in the phase transformation heat is absorbed to cool said building.

2. The energy storage means of claim 1 wherein the working fluid is flammable and selectively passes through an element selected from the group consisting of; working fluid burner, electrical generator, refrigerator, and water heater.

3. The energy storage means of claim 1 wherein a gas working fluid storage means is provided and the compression operation moves working fluid from said gas working fluid storage means to said liquid working fluid storage means and wherein after fluid is transformed back to said gas state it is stored in said gas working fluid storage means.

4. The energy storage means of claim 3 wherein one further limitation is selected from the group consisting of the containment volume of said liquid fluid storage means is variable, and the containment volume of said gas working fluid storage means is variable.

5. The energy storage means of claim 4 wherein both the containment volume of said liquid fluid storage means is variable, and the containment volume of said gas working fluid storage means is variable, and whereby both variabilities are interdependent such that a change in the containment volume of one storage means causes a force to change the containment volume of the other storage means.

6. The energy storage means of claim 1 wherein computer logic controls said compressor to operate according to calculations that include anticipated electricity costs at least 48 hours in advance.

7. The energy storage means of claim 1 wherein computer logic controls said compressor to operate according to calculations that include anticipated weather forecast at least 48 hours in advance.

8. The energy storage means of claim 1 wherein working fluid transformation from said gas working fluid to said liquid working fluid liquid is performed according to a first schedule and working fluid transformation from said liquid working fluid to said gas working fluid is performed according to a second schedule comprising at least 48 hours.

9. The energy storage means of claim 1 wherein an estimated thermal units of cooling required to cool the building over a period of 48 hours is calculated.

10. The energy storage means of claim 9 wherein said estimated thermal units calculation includes a weather forecast comprising at least one selected from the group consisting of forecasted temperature, forecasted humidity, forecasted cloudiness, and forecasted windiness.

11. The energy storage means of claim 1 wherein at least two sensors are selected from the group comprising, a ground source temperature sensor, an air source temperature, and a water source temperature sensor.

12. The energy storage means of claim 1 wherein other than heat absorption, the working fluid phase change from liquid to gas requires no electricity energy, wind energy, or solar energy input.

13. The energy storage means of claim 1 wherein solar energy is selected and used to heat a second fluid, the heating causing pressure in the second fluid which is then used to drive the compressor.

14. The energy storage means of claim 1 wherein a utility operates said liquid fluid storage means and multiple utility customers are connected to said liquid fluid storage means such that said compressor is powered a first utility customer to compress said gas working fluid to become said liquid working fluid to perform a heating application for said first utility customer, said liquid working fluid is then stored in the liquid fluid storage means, and said working fluid is withdrawn from the liquid fluid storage means, and phase transformed from said liquid state to said gas by a second utility customer.

15. The energy storage means of claim 14 wherein working fluid in said liquid state is assigned a higher economic value than working fluid in said gas state and said utility assesses one selected from the group consisting of; an economic cost is assessed to said second utility customer for units of working fluid transformed from said liquid state to said gas state, and an economic benefit is assessed to said first utility customer for units of working fluid transformed from said gas working fluid to said liquid working fluid.

16. An energy storage means comprising;
a vacuum pump,
a liquid working fluid,
a gas working fluid storage means,
a building,
whereby an energy source and a time are selected from the group consisting of;
electricity energy and a time determined by computer logic to operate said vacuum pump when electricity cost is cheapest,
electricity energy and a time determined by computer logic to operate said vacuum pump when environmental conditions are calculated to minimize cost,
electricity energy and a time determined by computer logic to operate said vacuum pump when environmental conditions are calculated to maximize efficiency,
solar energy and a time to operate said vacuum pump when captured solar energy is enough to power said compressor,
and wind energy and a time to operate said vacuum pump when captured wind energy is enough to power said vacuum pump,
and at the time selected, using said energy source, said vacuum pump is powered for the purpose of transforming said liquid working fluid to become a gas working fluid which is then stored in said gas working fluid storage means,
and at a time subsequent to said time selected, when said vacuum pump is not powered, said gas working fluid is phase transformed from a gas state back to a liquid state and in the phase transformation heat is released to heat said building.

17. The energy storage means of claim 16 wherein said liquid working fluid is water.

18. The energy storage means of claim 17 wherein after the phase transformation back to said liquid state, said water is placed into a potable water system.

19. The energy storage means of claim 16 wherein the heat required in transforming said liquid working fluid to become a gas working fluid is absorbed from one selected from the group consisting of; a water body heat source, a ground heat source, and an air heat source.

20. The energy storage means of claim 16 wherein computer logic controls said compressor to operate according to calculations that include once selected from the group consisting of;
anticipated weather forecast at least 48 hours in advance,
anticipated electricity costs at least 48 hours in advance.

* * * * *